(12) United States Patent
Ishii

(10) Patent No.: US 9,020,847 B2
(45) Date of Patent: Apr. 28, 2015

(54) INFORMATION PROCESSING APPARATUS, ORDERING SYSTEM, AND ORDER MANAGEMENT METHOD

(75) Inventor: Yuichi Ishii, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 393 days.

(21) Appl. No.: 13/477,318

(22) Filed: May 22, 2012

(65) Prior Publication Data

US 2012/0303493 A1  Nov. 29, 2012

(30) Foreign Application Priority Data

May 27, 2011  (JP) ................... 2011-118926

(51) Int. Cl.
*G06Q 10/00* (2012.01)
*G06Q 10/08* (2012.01)
*G06Q 30/06* (2012.01)

(52) U.S. Cl.
CPC ............... *G06Q 10/08* (2013.01); *G06Q 30/06* (2013.01)

(58) Field of Classification Search
None
See application file for complete search history.

(56) References Cited

U.S. PATENT DOCUMENTS 5,077,582 A * 12/1991 Kravette et al. ............ 399/8
2002/0087419 A1  7/2002 Andersson et al.
2003/0032421 A1  2/2003 Izumi et al.
2003/0118353 A1 * 6/2003 Baller et al. ............ 399/8
2011/0066886 A1  3/2011 Sugiura et al.

FOREIGN PATENT DOCUMENTS

JP  2003-050882  2/2003
JP  2003-308195  10/2003
JP  2005-165092  6/2005

OTHER PUBLICATIONS

Extended European Search Report dated Sep. 19, 2012.
Japanese Office Action dated Dec. 2, 2014.

* cited by examiner

*Primary Examiner* — Paul Danneman
(74) *Attorney, Agent, or Firm* — IPUSA, PLLC

(57) ABSTRACT

An information processing apparatus connected via a data communication channel to an electronic apparatus and a management apparatus. The information processing apparatus includes an apparatus status reception unit configured to receive, from the electronic apparatus, apparatus status information including error identifiers indicating errors detected at the electronic apparatus; an ordering unit configured to place error support orders corresponding to the error identifiers in the received apparatus status information to the management apparatus and to receive order results from the management server in response to the error support orders; and a message transmission unit configured to send a message indicating order status of the error support orders to the electronic apparatus based on the received order results and thereby request the electronic apparatus to display the order status.

15 Claims, 20 Drawing Sheets

FIG.4

| ORDER IDENTIFIER | ERROR IDENTIFIER | APPARATUS IDENTIFIER | ... |
|---|---|---|---|
| TICKET1 | E100 | MFP001 | ... |
| TICKET2 | E100 | MFP002 | ... |
| TICKET3 | E102 | MFP002 | ... |
| TICKET4 | E101 | MFP003 | ... |
| TICKET5 | E102 | MFP003 | ... |
| TICKET6 | E103 | MFP003 | ... |
| TICKET7 | E105 | MFP004 | ... |
| ... | ... | ... | ... |

| ERROR IDENTIFIER | DISPLAY CONTENT |
|---|---|
| E100 | "PAPER HAS BEEN ORDERED" |
| E101 | "TONER (BLACK) HAS BEEN ORDERED" |
| E102 | "TONER (CYAN) HAS BEEN ORDERED" |
| E103 | "TONER (MAGENTA) HAS BEEN ORDERED" |
| E104 | "TONER (YELLOW) HAS BEEN ORDERED" |
| E105 | "REPAIR SERVICE HAS BEEN ORDERED" |
| ... | ... |

FIG.7

| APPARATUS IDENTIFIER | ERROR IDENTIFIER (ERROR IDENTIFIERS CORRESPONDING TO ORDER STATUS BEING DISPLAYED) |
|---|---|
| MFP001 | E100 |
| MFP002 | E100, E102 |
| MFP003 | E100, E102, E103 |
| MFP004 | E105 |
| ... | ... |

92D

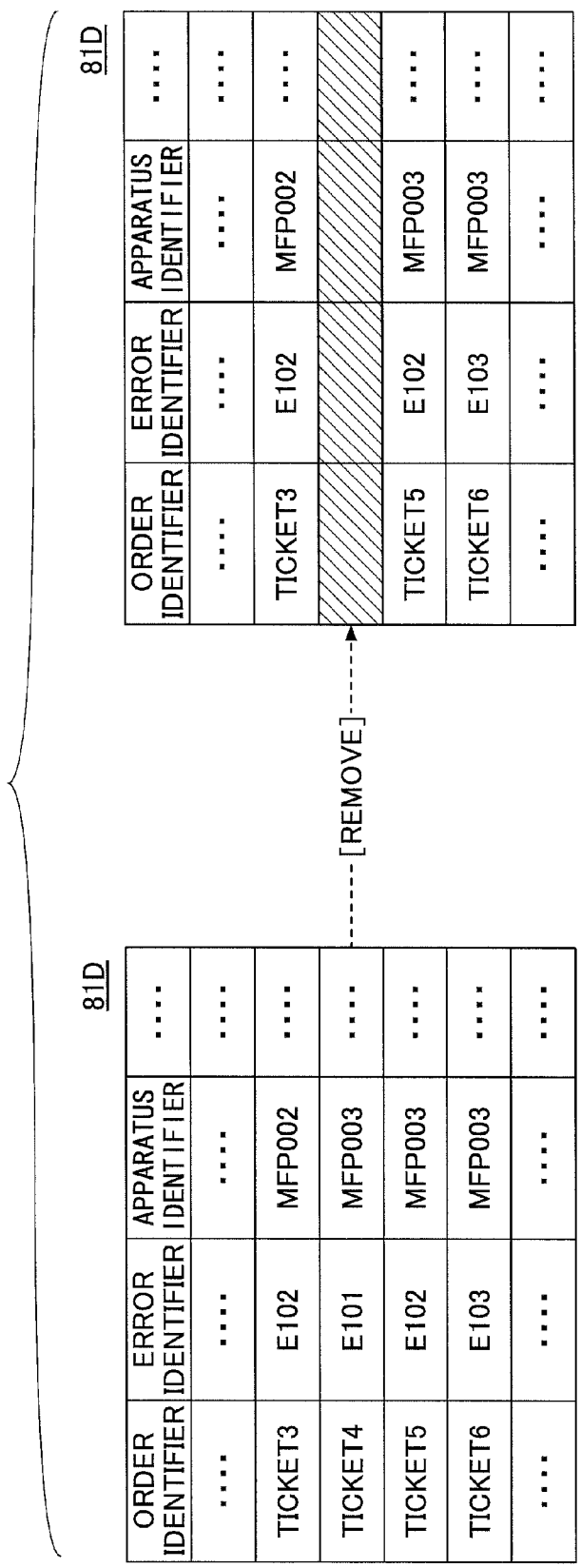

| APPARATUS IDENTIFIER | ERROR IDENTIFIER |
|---|---|
| MFP001 | E100 |
| MFP002 | E100, E102 |
| MFP003 | E101, E102, E103 |
| MFP004 | E105 |
| .... | |

---[UPDATE]-->

92D

| APPARATUS IDENTIFIER | ERROR IDENTIFIER |
|---|---|
| MFP001 | E100 |
| MFP002 | E100, E102 |
| MFP003 | E102, E103 |
| MFP004 | E105 |
| .... | |

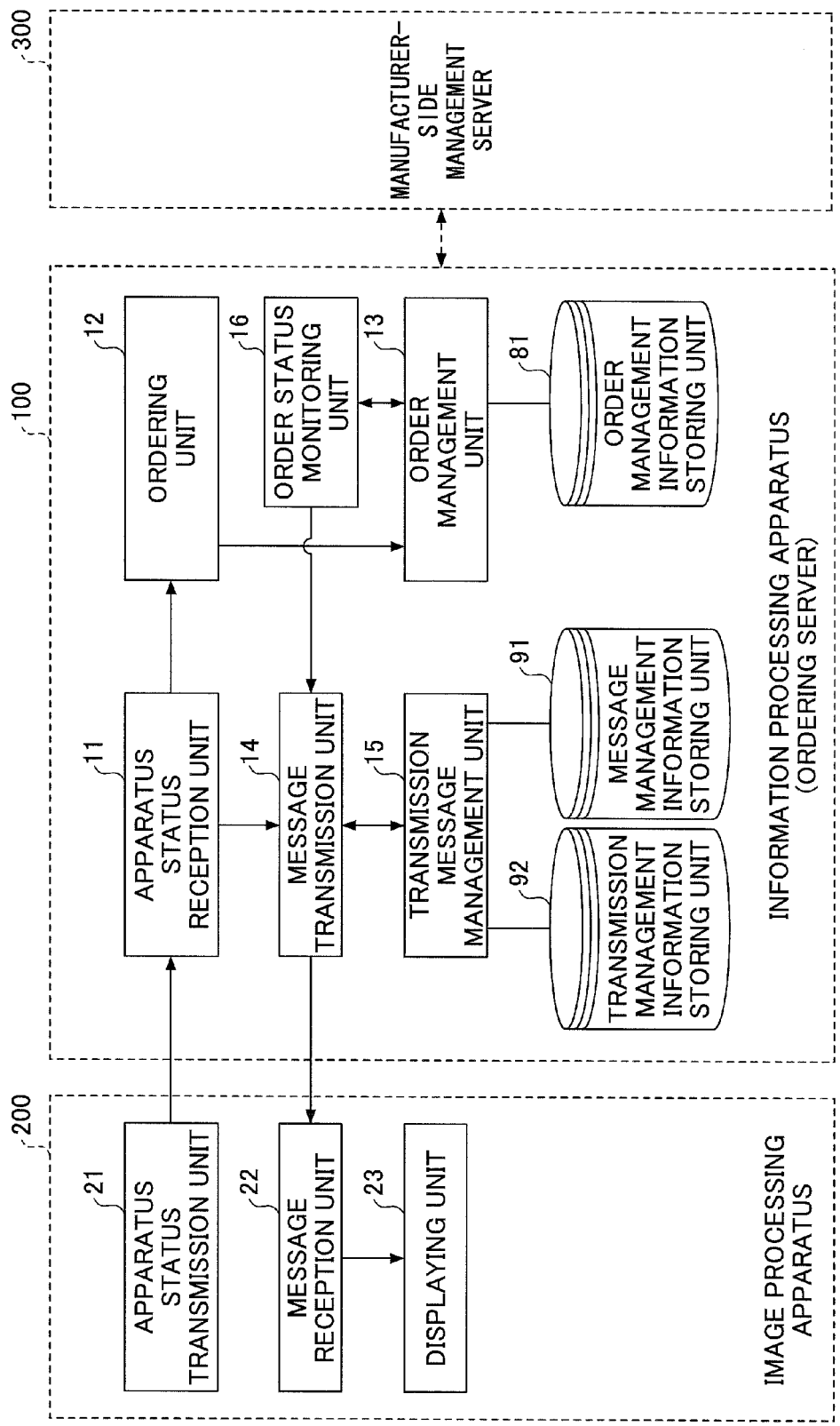

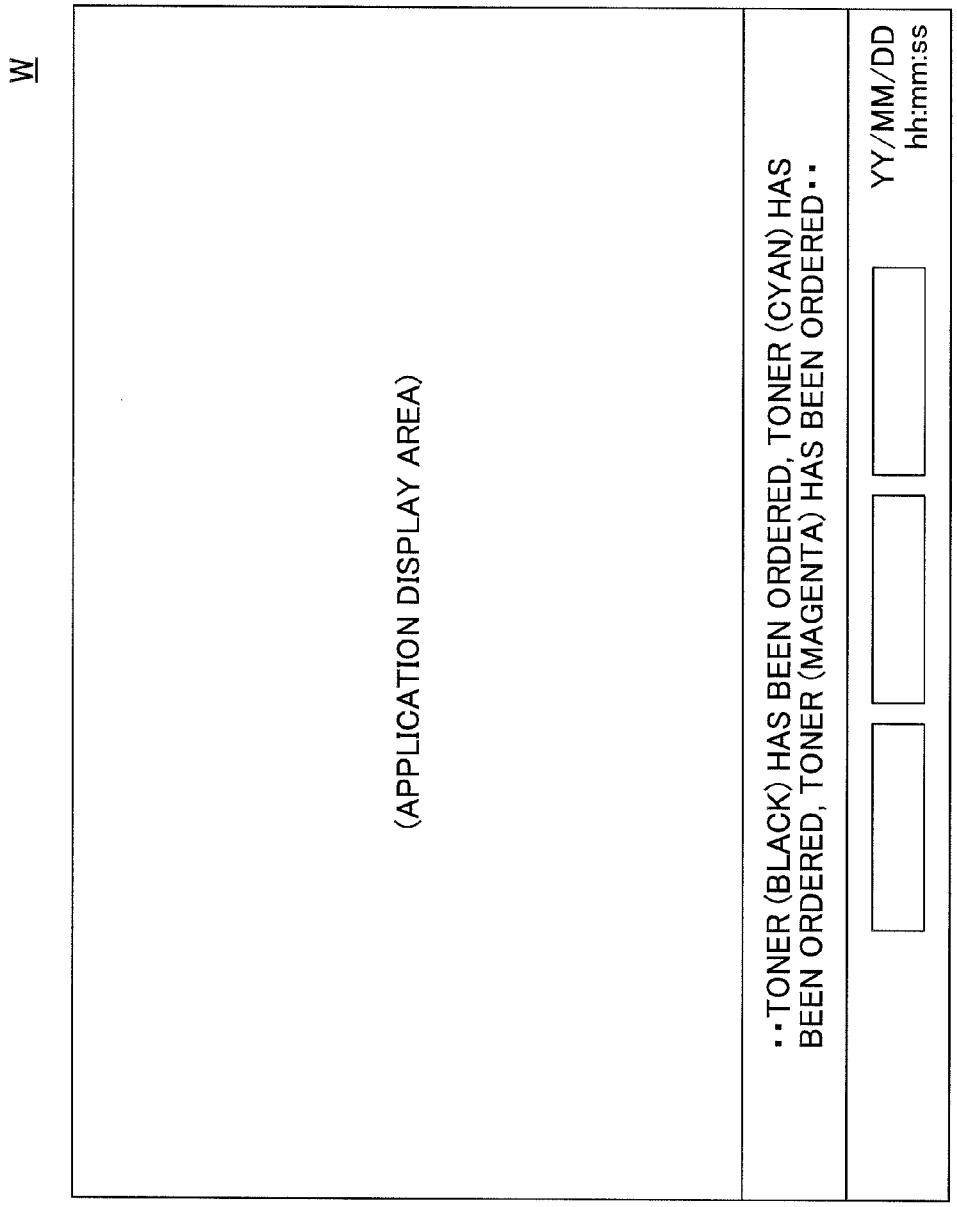

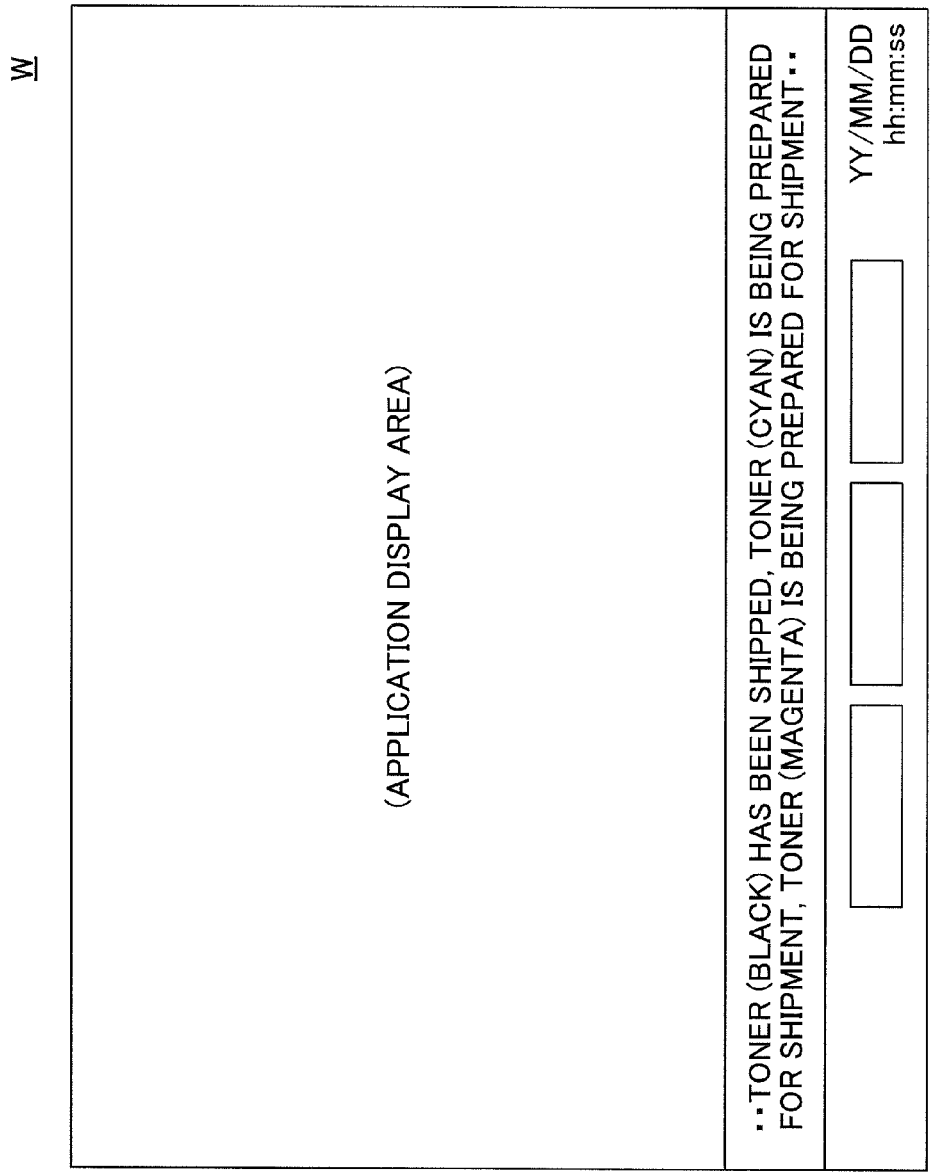

INFORMATION PROCESSING APPARATUS, ORDERING SYSTEM, AND ORDER MANAGEMENT METHOD

CROSS-REFERENCE TO RELATED APPLICATION

The present application is based upon and claims the benefit of priority of Japanese Patent Application No. 2011-118926, filed on May 27, 2011, the entire contents of which are incorporated herein by reference.

BACKGROUND OF THE INVENTION

1. Field of the Invention

An aspect of this disclosure relates to an information processing apparatus, an ordering system, and an order management method.

2. Description of the Related Art

An electronic apparatus including an image processing device needs consumables or supplies. For example, an electrophotographic image processing device needs consumables such as paper, toner, and photoconductors (image carriers). Such consumables are ordered from suppliers such as manufacturers by, for example, an administrator (a person who manages apparatuses, systems, etc.) according to their consumption status (e.g., the amount left/used, the degree of wear, etc.). However, in a user environment having a large number of electronic apparatuses, a process of checking the consumption status of consumables and ordering the consumables based on the consumption status is laborious for an administrator. For this reason, technologies for automating the process of ordering consumables have been proposed.

For example, Japanese Laid-Open Patent Publication No. 2005-165092 discloses a technology where orders for consumables of electronic apparatuses are centrally processed by a management server to reduce workload in ordering the consumables.

However, with related-art order management technologies, no mechanism is provided for the end user (or any user other than the administrator) to confirm the status of orders.

For example, although the management server disclosed in Japanese Laid-Open Patent Publication No. 2005-165092 allows the administrator to confirm the status of orders on a screen, the management server does not allow the end user to confirm the status of orders. This applies not only to the status of orders for consumables but also to the status of orders for troubleshooting (or repair) services.

In order management, for smooth operation of apparatuses, it is desirable to allow not only administrators but also end users to confirm the status of orders for consumables and troubleshooting services.

SUMMARY OF THE INVENTION

In an aspect of this disclosure, there is provided an information processing apparatus connected via a data communication channel to an electronic apparatus and a management apparatus. The information processing apparatus includes an apparatus status reception unit configured to receive, from the electronic apparatus, apparatus status information including error identifiers indicating errors detected at the electronic apparatus; an ordering unit configured to place error support orders corresponding to the error identifiers in the received apparatus status information to the management apparatus and to receive order results from the management server in response to the error support orders; and a message transmission unit configured to send a message indicating order status of the error support orders to the electronic apparatus based on the received order results and thereby request the electronic apparatus to display the order status.

BRIEF DESCRIPTION OF THE DRAWINGS

FIG. 4 is a table illustrating exemplary order management information according to the first embodiment;

FIG. 5 is a table illustrating exemplary order management information according to the first embodiment;

FIG. 7 is a table illustrating exemplary transmission management information according to the first embodiment;

FIGS. 11A and 11B are drawings illustrating exemplary changes made to order management information and transmission management information;

FIG. 12 is a drawing illustrating an exemplary functional configuration of an ordering system according to a variation of the first embodiment;

FIGS. 18A and 18B are drawings illustrating exemplary order status displayed on a screen according to a variation of the second embodiment.

DESCRIPTION OF THE PREFERRED EMBODIMENTS

Preferred embodiments of the present invention are described below with reference to the accompanying drawings. In the descriptions below, an order for a consumable or a troubleshooting service may be referred to as an "error support order", and an event that necessitates an error support order is referred to as an "error".

<<First Embodiment>>
<System Configuration>

Figure 1:
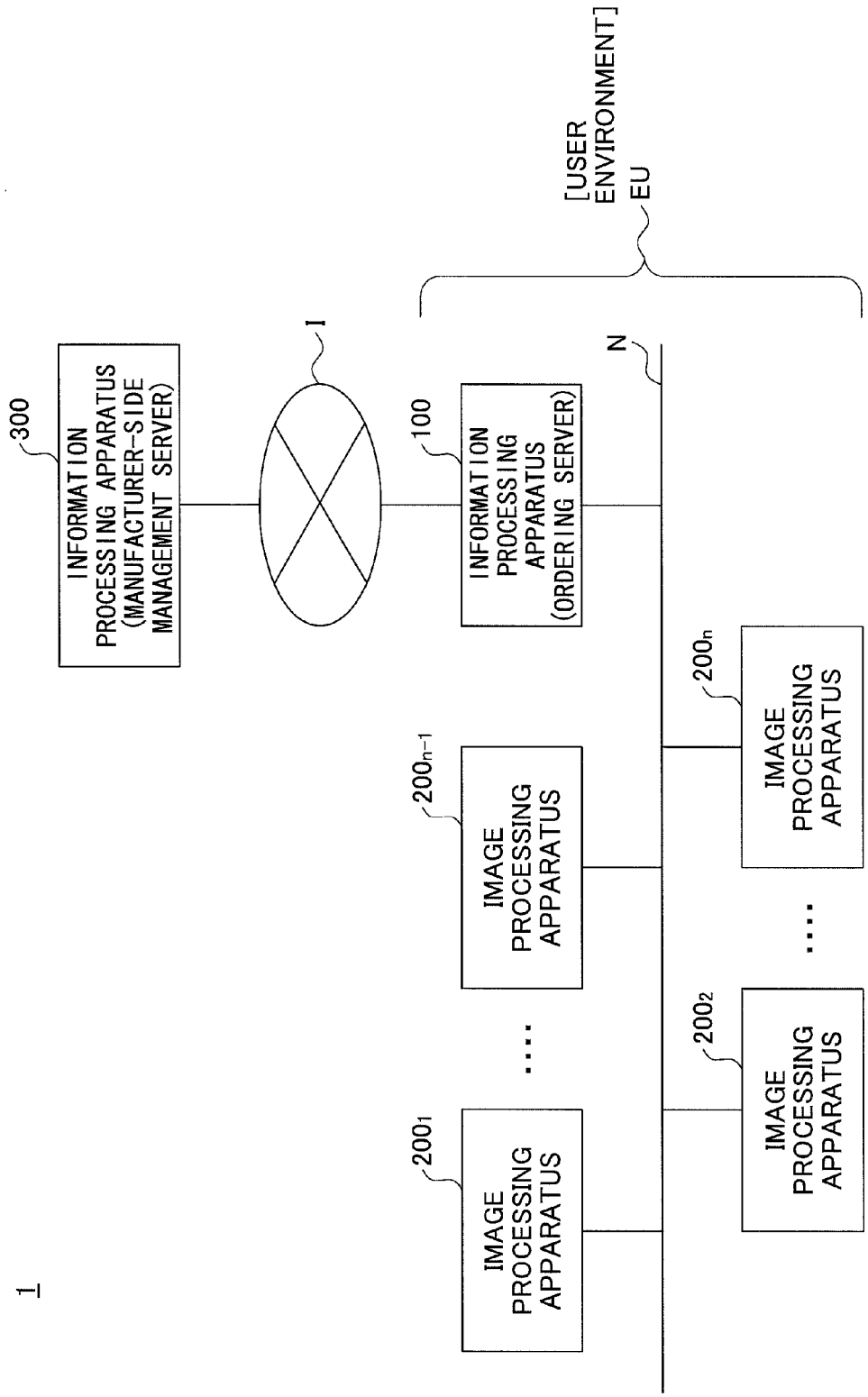
FIG. 1 is a drawing illustrating an exemplary configuration of an ordering system according to a first embodiment.

FIG. 1 is a drawing illustrating an exemplary configuration of an ordering system 1 according to a first embodiment.

As illustrated in FIG. 1, the ordering system 1 may include an information processing apparatus 100 and image processing apparatuses $200_1$-$200_n$ (may be referred to as the image processing apparatus(es) 200 for descriptive purposes) that are connected to each other via a data communication channel (internal network N).

The information processing apparatus 100 may include an order management function for managing error support orders, and may also be referred to as an ordering server. The information processing apparatus 100 may be implemented by, for example, a personal computer (PC), and places error support orders to manufacturers based on data received from the image processing apparatuses 200.

The image processing apparatus 200 may include image processing functions. The image processing apparatus 200 may be implemented by, for example, a laser printer (LP) or a multifunction peripheral (MFP) including image processing functions such as a copy function, a scan function, and a print function.

The information processing apparatus 100 and the image processing apparatuses 200 connected to each other via the internal network N constitute a user environment EU. The user environment EU is, for example, a network environment constructed in an office or a building where apparatuses are installed. The internal network N may be, for example, a local area network (LAN).

The internal network N is connected via an external network I to an information processing apparatus 300 at a manufacturer. Here, it is assumed that the internal network N and the information processing apparatus 300 are connected to the external network I via firewalls (not shown).

The information processing apparatus 300 may include an error support function for processing error support orders, and may also be referred to as a manufacturer-side management server or a management apparatus. The information processing apparatus 300 may be implemented by, for example, a personal computer (PC), and processes error support orders received from the image processing apparatuses 100 in the user environment EU. Hereafter, to distinguish from the information processing apparatus 100, the information processing apparatus 300 is referred to as the manufacturer-side management server 300.

With the above described configuration, the ordering system 1 may provide services as described below. For example, the image processing apparatus 200 detects a status change (an error) such as a shortage or wear of a consumable or occurrence of a failure, and sends apparatus status information including the detected status change to the information processing apparatus 100 to request placement of an error support order.

The information processing apparatus 100 determines an error support order (an order for a consumable and/or an order for a troubleshooting service) to be placed based on the apparatus status information received from the image processing apparatus 200, and sends the error support order to the manufacturer-side management server 300.

Based on the error support order received from the information processing apparatus 100, the manufacturer-side management server 300 performs a process to solve the error occurred at the image processing apparatus 200. For example, when the error support order is an order for a consumable, the manufacturer-side management server 300 performs a process to deliver (ship or supply) the consumable to the user environment EU. Meanwhile, when the error support order is an order for a troubleshooting service, the manufacturer-side management server 300 performs a process to send a serviceperson to the user environment EU.

With the above configuration, the ordering system 1 can provide an automatic order function (automatic order service).

<Hardware Configuration>

Figure 2:
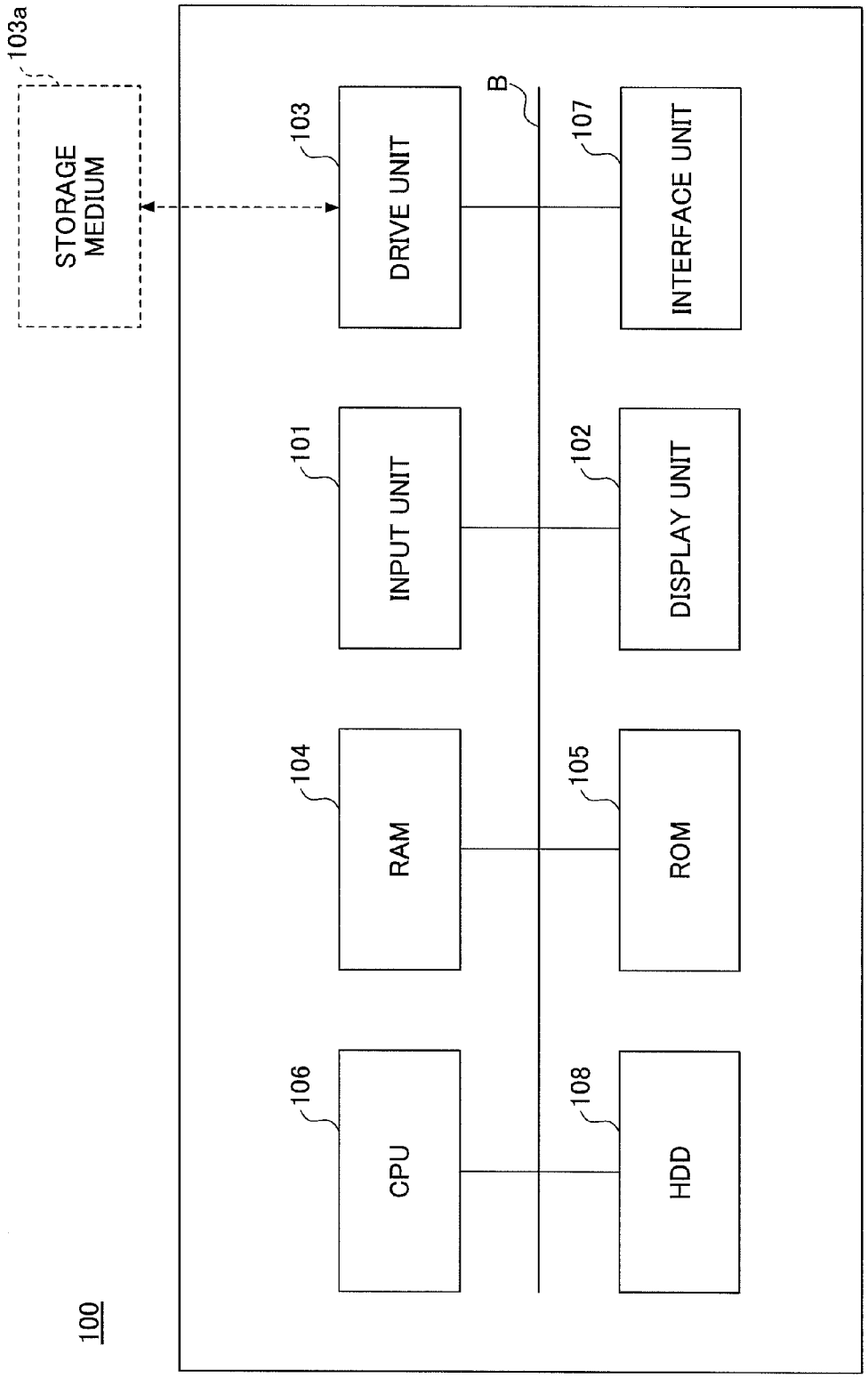
FIG. 2 is a block diagram illustrating an exemplary hardware configuration of an information processing apparatus according to the first embodiment.

FIG. 2 is a block diagram illustrating an exemplary hardware configuration of the information processing apparatus 100 according to the present embodiment.

As illustrated in FIG. 2, the information processing apparatus 100 may include an input unit 101, a display unit 102, a drive unit 103, a random access memory (RAM) 104, a read only memory (ROM) 105, a central processing unit (CPU) 106, an interface unit 107, and a hard disk drive (HDD) 108 that are connected to each other via a bus B.

The input unit 101 includes, for example, a keyboard and a mouse, and is used to input instructions (or operation signals) to the information processing apparatus 100. The display unit 102 displays, for example, processing results of the information processing apparatus 100.

The interface unit 107 connects the information processing apparatus 100 to a data communication channel (the internal network N). The information processing apparatus 100 can communicate with other apparatuses via the interface unit 107.

The HDD 108 is a non-volatile storage medium for storing various programs and data. For example, the HDD 108 may stores basic software (e.g., an operating system such as Windows (trademark/registered trademark) or UNIX (trademark/registered trademark)) for controlling the entire information processing apparatus 100, and applications that run on the basic software and provide various functions (e.g., an order management function).

The HDD 108 may manage the stored programs and data using a file system and/or a database (DB). For example, data (job data) received from the image processing apparatuses 200 may be stored in a predetermined storage area of the HDD 108 and managed using a database.

The drive unit 103 is an interface between the information processing apparatus 100 and a removable storage medium 103a. The information processing apparatus 100 can read and write data from and to the storage medium 103a via the drive unit 103. Examples of the storage medium 103a include a floppy (flexible) disk (FD), a compact disk (CD), a digital versatile disk (DVD), a secure digital (SD) memory card, and a universal serial bus (USB) memory.

The ROM 105 is a non-volatile semiconductor memory (storage unit) that can retain data even when the power is turned off. For example, the ROM 105 stores programs and data such as a basic input/output system (BIOS) that is executed when the information processing apparatus 100 is turned on, and system and network settings of the information processing apparatus 100.

The RAM 104 is a volatile semiconductor memory (storage unit) for temporarily storing programs and data. The CPU 106 loads programs and data from storage units (e.g., the HDD 108 and the ROM 105) into the RAM 104 and executes the loaded programs to control the information processing apparatus 100 and to implement various functional units of the information processing apparatus 100.

With the above hardware configuration, the information processing apparatus 100 can provide an order management function (order management service).

<Order Management Function>

An order management function according to the present embodiment is described below.

The information processing apparatus 100 of the present embodiment receives, as an order request, apparatus status information including a status change such as a shortage or wear of a consumable or occurrence of a failure. Based on the order request, the information processing apparatus 100 places an error support order to the manufacturer-side management server 300. Then, based on the result of placing the error support order, the information processing apparatus 100 sends a message indicating the status of the error support order (may be simply called "order status") to the image processing apparatus 200 that has sent the order request (hereafter, an image processing apparatus 200 that has sent an order request may be referred to as a "requesting image processing apparatus 200"), and thereby requests the requesting image processing apparatus 200 to display the order status. The information processing apparatus 100 of the present embodiment includes the order management function as described above.

As described above, with related-art order management technologies, no means is provided for the end user to confirm the status of orders. This may result in, for example, duplicate error support orders from the end user.

To prevent or reduce problems in the related-art order management technologies, the information processing apparatus 100 of the present embodiment is configured to send a message indicating the status of an error support order to the requesting image processing apparatus 200.

In other words, the information processing apparatus 100 provides an environment for reporting the status of error support orders related to the image processing apparatuses 200 to the end users. For example, this configuration makes it possible to prevent duplicate error support orders.

An exemplary functional configuration and operations of the ordering system 1 are described below.

Figure 3:
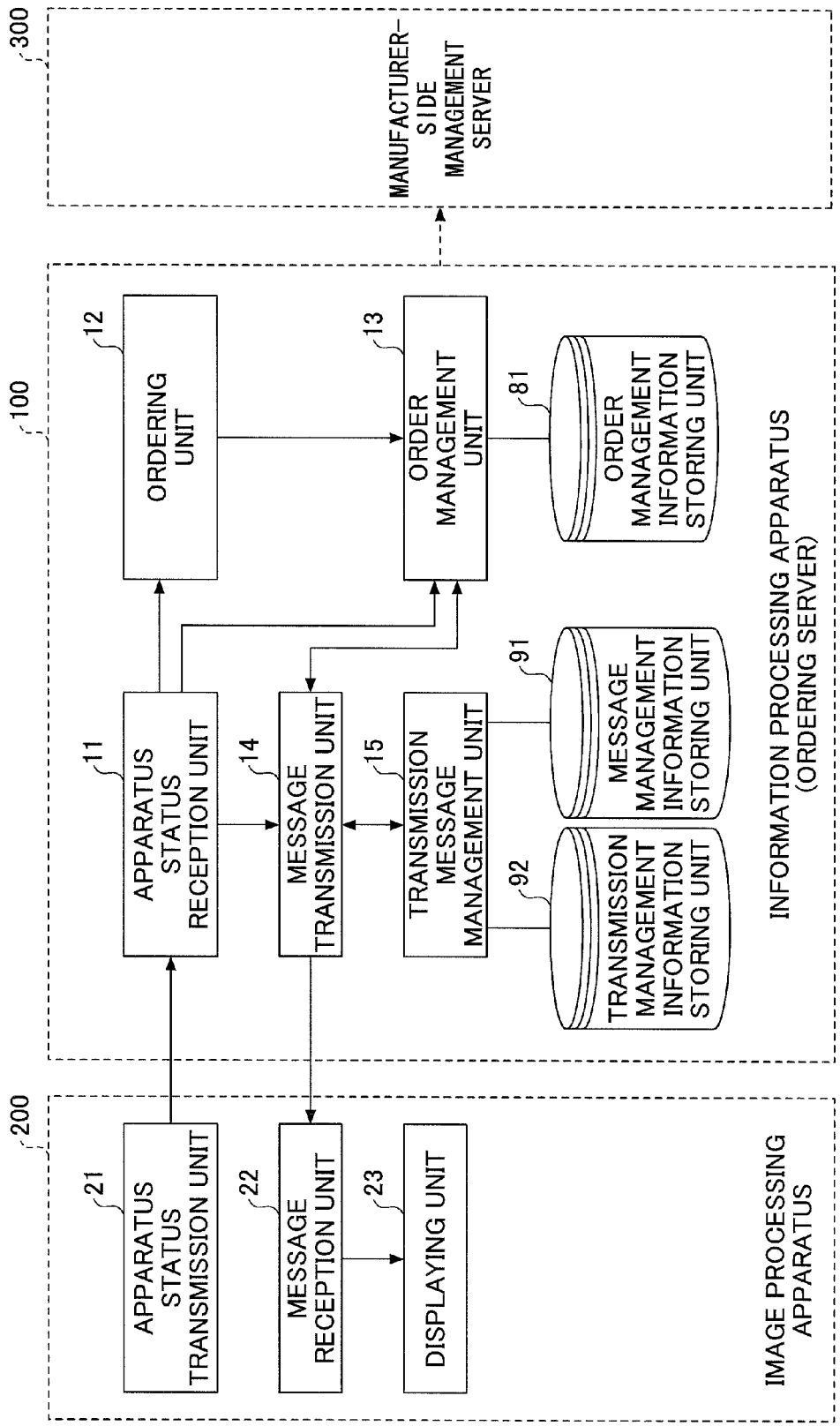
FIG. 3 is a drawing illustrating an exemplary functional configuration of an ordering system according to the first embodiment.

FIG. 3 is a drawing illustrating an exemplary functional configuration of the ordering system 1 according to the first embodiment.

As illustrated in FIG. 3, the information processing apparatus 100 may include an apparatus status reception unit 11, an ordering unit 12, an order management unit 13, a message transmission unit 14, and a transmission message management unit 15; and the image processing apparatus 200 may include an apparatus status transmission unit 21, a message reception unit 22, and a displaying unit 23. These functional units collaborate with each other to provide various functions of the ordering system 1. Functions provided by the above functional units include [1] an error detection and ordering function for requesting an order when an error is detected, and [2] an order status update function for updating order status when an error recovery (completion of an error support process) is detected. The functional units and the functions provided by the functional units are described below.

[1] Error Detection and Ordering Function

<Functional Units of Image Processing Apparatus>

The apparatus status transmission unit 21 is a functional unit that transmits apparatus status information indicating an error detected at the image processing apparatus 200 to the information processing apparatus 100, and thereby requests the information processing apparatus 100 to place an error support order.

The apparatus status information may include apparatus identification information (e.g., an apparatus name, a serial number, or a product number) of the image processing apparatus 200. The apparatus status information may also include error information indicating a detected error. When an error is related to a consumable, the error information (hereafter called "consumable error information") may include identification information (e.g., a serial number) of the consumable and consumption status information (including, for example, an error code indicating a level of consumption of the consumable). When an error is related to a failure, the error information (hereafter called "failure information") may include information indicating the failure occurred (e.g., en error code corresponding to the occurred failure). These information items in the error information may be called error identification information.

The apparatus status transmission unit 21 sends the apparatus status information based on a preset network setting (e.g., an Internet Protocol (IP) address) of the information processing apparatus 100.

The message reception unit 22 is a functional unit that receives a message (order status information) indicating the status of an error support order. The message reception unit 22 receives a message indicating the status of an error support order, as a display request to display order status, from the information processing apparatus 100.

The displaying unit 23 is a functional unit that displays information on a display unit of the image processing apparatus 200. The displaying unit 23 displays the received message on the display unit in response to the display request. The display unit is, for example, an operations panel of the image processing apparatus 200. An exemplary screen displayed by the displaying unit 23 is described later.

<Functional Units of Information Processing Apparatus>

The apparatus status reception unit 11 is a functional unit that receives apparatus status information. The apparatus status reception unit 11 receives apparatus status information including error information, as an order request to place an error support order, from the image processing apparatus 200. The apparatus status reception unit 11 determines a product and/or a service to be ordered from a manufacturer based on the received apparatus status information.

For example, when consumable error information (e.g., identification information or consumption status information of a consumable) is included in the apparatus status information, the apparatus status reception unit determines a consumable to be ordered based on the consumable error information. Meanwhile, when failure information indicating an occurred failure is included in the apparatus status information, the apparatus status reception unit 11 determines a troubleshooting service (for the occurred failure) to be ordered based on the failure information. When both the consumable error information and the failure information are included in the apparatus status information, the apparatus status reception unit 11 determines a consumable and a troubleshooting service to be ordered based on the consumable error information and the failure information.

The ordering unit 12 is a functional unit that places an error support order to the manufacturer. Based on the consumable and/or the troubleshooting service (or any other product or service) determined by the apparatus status reception unit 11, the ordering unit 12 generates order information, and sends the order information to the manufacturer-side management server 300.

The order information may include customer information such as the identification information of the requesting image processing apparatus 200, and information indicating the consumable and/or the troubleshooting service to be ordered.

The ordering unit 12 sends the generated order information based on a preset network setting of the manufacturer-side management server 300.

The order management unit 13 is a functional unit that manages orders placed to the manufacturer. The order management unit 13 accesses an order management information storing unit 81 storing order management information, and manipulates the order management information to manage orders. The order management information storing unit 81 may be implemented by, for example, a storage area of a storage unit (e.g., the HDD 108) of the information processing apparatus 100. For example, the order management unit 13 registers (or adds), removes (erases), and retrieves (or refers to) the order management information (or data) in the order management information storing unit 81.

Exemplary order management information is described below.

FIG. 5 is a table illustrating exemplary order management information 81D according to the first embodiment.

As illustrated in FIG. 4, the order management information 81D includes an order identifier field, an error identifier field, and an apparatus identifier field for each order.

The order identifier field stores identification information (order identification information or an order identifier) of each order. For example, the order identifier field stores a unique number that is assigned to an order and sent from the manufacturer-side management server 300 in response to the order The error identifier field stores identification information (error identification information or an error identifier) of an error. For example, the error identification field stores an error code indicating consumption status of a consumable or an occurred failure. The apparatus identifier field stores apparatus identification information such as an identifier of the requesting image processing apparatus 200.

For example, when an error support order is placed to the manufacturer in response to an order request from the image processing apparatus 200 and a result of the order is received from the manufacturer, the order management unit 13 manipulates the order management information 81D as described below. When receiving an order record addition request from the ordering unit 12, the order management unit 13 adds an order record to the order management information 81D in the order management information storing unit 81 based on order identification information received as an order result from the manufacturer-side management server 300, error information used to generate order information, and apparatus identification information of the requesting image processing apparatus 200. The order record includes order identification information, error identification information, and apparatus identification information (i.e., values of the order identifier field, the error identifier field, and the apparatus identifier field) that are associated with each other.

Thus, in the information processing apparatus 100, the order management unit 13 records and manages the order management information 81D on error support orders placed to the manufacturer.

Also, when receiving an information retrieval request with order identification information from other functional units, the order management unit 13 retrieves an order record (values of the order identifier field, the error identifier field, and the apparatus identifier field) from the order management information 81D based on the order identification information.

Referring back to FIG. 3, the message transmission unit 14 is a functional unit that sends a message (order status information) indicating the status of an error support order (order status). When an order result is received from the manufacturer-side management server 300, the message transmission unit 14 sends a message indicating order status to the requesting image processing apparatus 200, and thereby requests the requesting image processing apparatus 200 to display the order status.

The transmission message management unit 15 is a functional unit that manages messages sent to the image processing apparatuses 200. The transmission message management unit 15 accesses a message management information storing unit 91 storing message management information and a transmission management information storing unit 92 storing transmission management information, and manipulates the message management information and the transmission management information to manage messages. The message management information storing unit 91 and the transmission management information storing unit 92 may be implemented by, for example, storage areas of a storage unit (e.g., the HDD 108) of the information processing apparatus 100. Exemplary message management information is described below.

FIG. 5 is a table illustrating exemplary message management information 91D according to the first embodiment.

As illustrated in FIG. 5, the message management information 91D includes an error identifier field and display content field for each error type.

The error identifier field stores error identification information (or an error identifier) for each error type. The display content field stores information (display content information) representing order status to be displayed. For example, the display content field stores a character string indicating order status to be displayed on the requesting image processing apparatus 200.

Values in the error identifier field and the display content field may be set in advance. For this purpose, the transmission message management unit 15 provides a screen as illustrated in FIG. 6.

Figure 6:
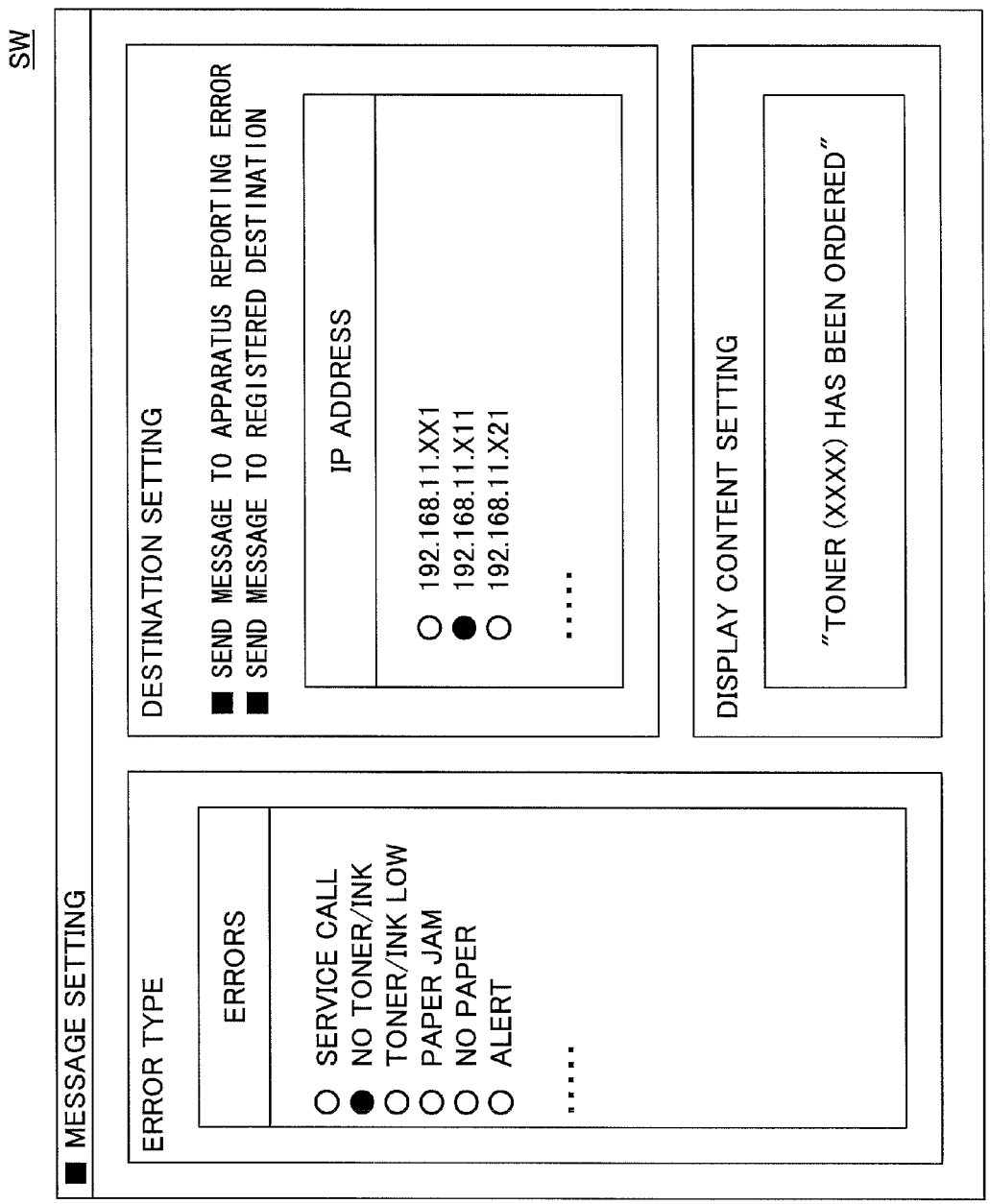
FIG. 6 is a drawing illustrating an exemplary message setting screen according to the first embodiment.

FIG. 6 is a drawing illustrating an exemplary message setting screen SW according to the first embodiment.

The message setting screen SW is a graphical user interface (GUI) that allows the administrator to set, for each error type, a destination of a message and a content to be displayed when the message is received at the image processing apparatus 200.

When the administrator specifies settings (or values) on the message setting screen SW, the transmission management unit 15 receives the settings, and registers management data including error identification information and display content information (i.e., values of the error identifier field and the display content field) in the message management information 91D based on the received settings.

Thus, in the information processing apparatus 100, the transmission message management unit 15 manages, for each error type, information representing order status to be displayed at the image processing apparatuses 200.

Referring back to FIG. 3, the message transmission unit 14 generates a message indicating order status based on the message management information 91D described above.

More specifically, the message transmission unit 14 obtains display content information from the message management information 91D based on error information used to generate order information. Next, the message transmission unit 14 generates, in a predetermined data format (e.g., eXtensible Markup Language (XML)), a message including a character string indicating order status based on the obtained display content information. The message transmission unit 14 also includes order identification information, which is received as an order result from the manufacturer-side management server 300, in the message.

Then, the message transmission unit 14 sends the generated message to the requesting image processing apparatus 200 based on its network setting, and thereby requests the requesting image processing apparatus 200 to display the order status.

Next, exemplary transmission management information is described.

FIG. 7 is a table illustrating exemplary transmission management information 92D according to the first embodiment.

As illustrated in FIG. 7, the transmission management information 92D includes an apparatus identifier field and an error identifier field for each apparatus.

The apparatus identifier field stores apparatus identification information of the requesting image processing apparatus 200. The error identifier field stores error identification information of one or more errors corresponding to order status being displayed at the image processing apparatus 200.

For example, when a message indicating order status is sent to the image processing apparatus 200 and a transmission result is received in response to the message, the transmission message management unit 15 manipulates the transmission management information 92D as described below. When receiving a transmission record addition request from the message transmission unit 14, the transmission message management unit 15 adds a transmission record to the transmission management information 92D based on apparatus identification information of the requesting image processing apparatus 200 and error information used to generate a message. The transmission record includes apparatus identification information and error identification information (i.e., values of the apparatus identifier field and the error identifier field) that are associated with each other.

Thus, in the information processing apparatus 100, the transmission message management unit 15 records and manages error identification information of errors corresponding to order status being displayed at the respective image processing apparatuses 200.

[2] Order Status Update Function
<Functional Units of Image Processing Apparatus>

The apparatus status transmission unit 21 sends, to the information processing apparatus 100, apparatus status information indicating a detected error recovery (i.e., an event such as "an ordered consumable has been attached" or "a failure has been corrected"), and thereby requests the information processing apparatus 100 to update order status.

The apparatus status information in this context includes apparatus identification information and recovery information indicating a detected recovery.

Recovery information related to a consumable (hereafter called "consumable recovery information") may include identification information and consumption status information of the consumable that has been "recovered". Meanwhile, recovery information related to a failure (hereafter called "failure recovery information") may include failure information indicating the failure that has been "recovered".
<Functional Units of Information Processing Apparatus>

The apparatus status reception unit 11 receives apparatus status information including recovery information, as an order status update request, from the image processing apparatus 200.

For example, when an order status update request is received from the image processing apparatus 200, the order management unit 13 manipulates the order management information 81D as described below. When receiving an order record removal request together with apparatus status information from the apparatus status reception unit 11, the order management unit 13 removes an order record (values of the order identifier field, the error identifier field, and the apparatus identifier field) from the order management information 81D based on the apparatus status information. In this process, the order management unit 13 identifies an order record in the order management information 81D corresponding to a recovered error based on apparatus identification information and consumable and/or failure recovery information in the apparatus status information.

The message transmission unit 14 generates, based on the message management information 91D and the transmission management information 92D, a message (indicating updated order status) to be transmitted to request the image processing apparatus 200 to display the updated order status.

More specifically, the message transmission unit 14 identifies, based on the apparatus identification information in the apparatus status information, error identification information in the transmission management information 92D which indicates errors corresponding to the order status currently being displayed at the image processing apparatus 200. Next, the message transmission unit 14 identifies, based on the recovery information in the apparatus status information, information items (i.e., identifiers) in the identified error identification information which correspond to errors that have not been recovered yet. Next, the message transmission unit 14 obtains display content information corresponding to the identified information items from the message management information 91D. Then, based on the obtained display content information, the message transmission unit 14 generates a message indicating updated order status.

Thus, in the information processing apparatus 100, the message transmission unit 14 generates a message indicating updated order status, i.e., a message indicating order status corresponding to errors that have not been recovered, and sends the generated message to the image processing apparatus 200.

Meanwhile, when a message indicating updated order status is sent to the image processing apparatus 200 and a transmission result is received in response to the message, the transmission message management unit 15 manipulates the transmission management information 92D as described below. When receiving a transmission record update request from the message transmission unit 14, the transmission message management unit 15 identifies error identification information in the transmission management information 92D based on the apparatus identification information of the requesting image processing apparatus 200. Next, the transmission message management unit 15 removes an information item(s) (or identifier(s)) in the identified error identification information that corresponds to the consumption status information and/or the failure information included in the recovery information used for message generation, and thereby updates the transmission management information 92D.

Thus, in the information processing apparatus 100, the transmission message management unit 15 manages the transmission management information 92D representing errors corresponding to updated order status being displayed at the respective image processing apparatuses 200.

As described above, the order management function of the present embodiment is provided through collaboration among the functional units. The above functional units are implemented by executing programs (software for implementing the order management function) installed in the information processing apparatus 100 and the image processing apparatus 200. For example, in each of the information processing apparatus 100 and the image processing apparatus 200, the programs are loaded by a processing unit (e.g., CPU)

from a storage unit (e.g., ROM or HDD) into a memory (e.g., RAM) and are executed to implement the corresponding functional units.

Exemplary processes (collaboration among the functional units) performed to provide the order management function of the present embodiment are described below.

<Process for Displaying Order Status>

Figure 8:
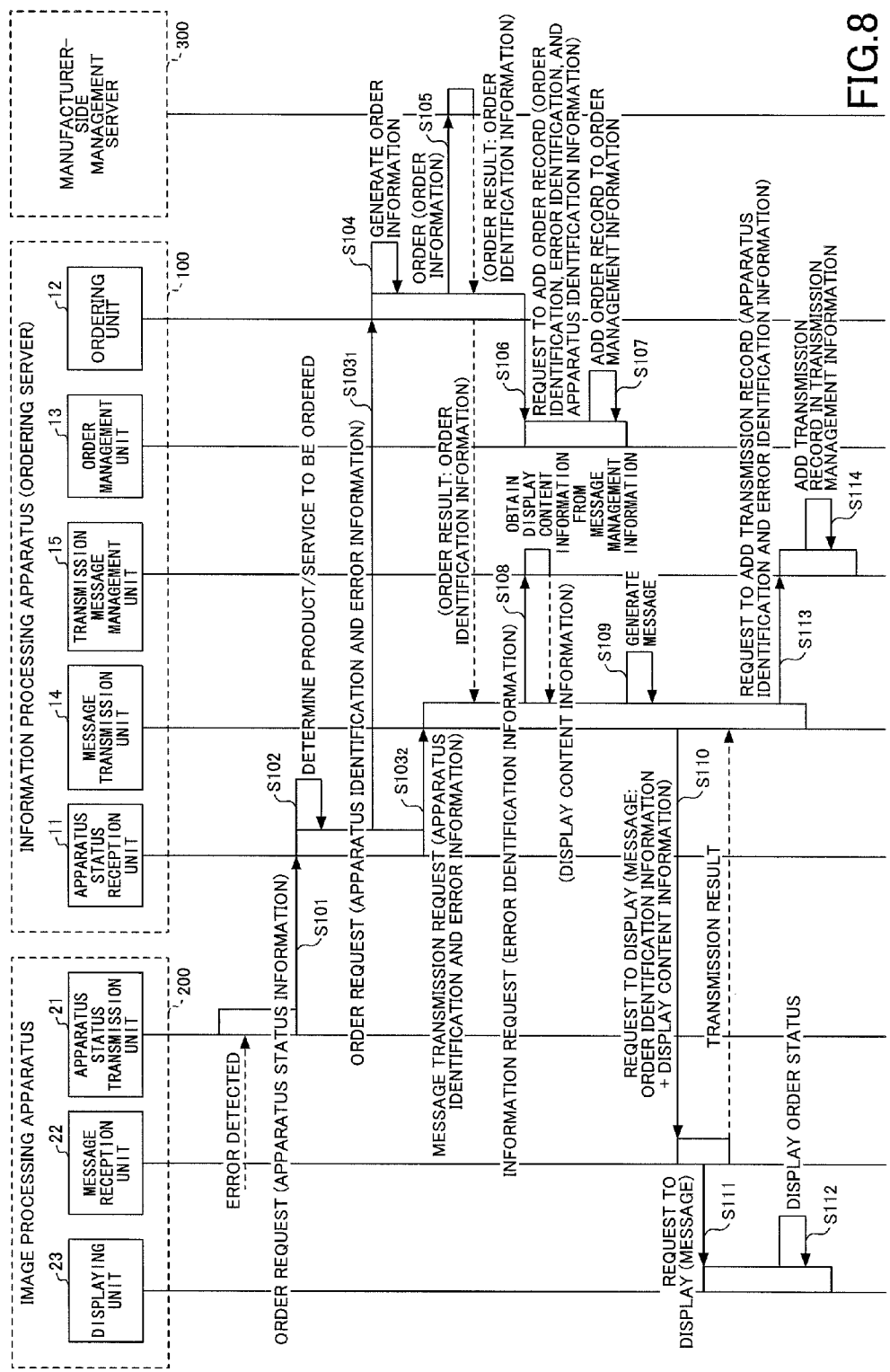
FIG. 8 is a sequence chart illustrating an exemplary process for displaying order status (message display process) according to the first embodiment.

FIG. 8 is a sequence chart illustrating an exemplary process for displaying order status (message display process) according to the first embodiment. In the process of FIG. 8, it is assumed that toner errors ("NO TONER/INK") of black, cyan, and magenta toners represented by E101, E102, and E103 are detected at an image processing apparatus 200 represented by MFP003.

As illustrated in FIG. 8, when toner errors are detected, the apparatus status transmission unit 21 of the image processing apparatus 200 sends apparatus status information as an order request to the information processing apparatus 100 to request the information processing apparatus 100 to place orders for toners (step S101).

The apparatus status reception unit 11 of the information processing apparatus 100 receives the apparatus status information, i.e., the order request, from the image processing apparatus 200.

The apparatus status reception unit 11 determines products (consumables) and/or services to be ordered based on the received apparatus status information (step S102). In this exemplary process, the apparatus status reception unit 11 identifies the toner errors of black, cyan, and magenta toners based on toner error information (including, for example, toner identification information and/or toner consumption status information) in the apparatus status information, and thereby determines toners to be ordered.

Then, the apparatus status reception unit 11 requests the ordering unit 12 to order the determined toners (step S103$_1$). In this step, the apparatus status reception unit 11 sends the apparatus identification information and the toner error information in the apparatus status information to the ordering unit 12.

Also, the apparatus status reception unit 11 requests the message transmission unit 14 to send a message indicating order status of the toners (step S103$_2$). In this step, the apparatus status reception unit 11 sends the apparatus identification information and the toner error information in the apparatus status information to the message transmission unit 14 as a message transmission request.

When receiving the request, the ordering unit 12 generates order information for the toners (step S104), and sends the order information to the manufacturer-side management server 300 to order the toners (step S105). In this step, the ordering unit 12 generates the order information for each of the toners based on the apparatus identification information and the toner error information. In other words, the ordering unit 12 places error support orders corresponding to error identification information (or error identifiers) in the apparatus status information.

The ordering unit 12 receives order results from the manufacturer-side management server 300 as responses to the plural sets of order information. Each of the order results includes a number (order identification information or an order identifier) automatically assigned by the manufacturer-side management server 300 to the order information. In this example, the order results include "TICKET4", "TICKET5", and "TICKET6", respectively.

When receiving the order results, the ordering unit 12 requests the order management unit 13 to add order records for the ordered toners (step S106). To request addition of the order records, the ordering unit sends the order identification information of each type of toner, the error identification information (toner consumption status information) included in the toner error information of each type of toner, and the apparatus identification information to the order management unit 13.

When receiving the request, the order management unit 13 accesses the order management information storing unit 81 and adds order records for the ordered toners to the order management information 81D (step S107). More specifically, the order management unit 13 adds the values of the order identification information, the error identification information, and the apparatus identification information for each of the ordered toners into the order identifier filed, the error identifier field, and the apparatus identifier field of the order management information 81D. For example, for black toner, the order management unit 13 adds "TICKET4" as the order identification information, "E101" as the error identification information, and "MFP003" as the apparatus identification information into the corresponding fields of the order management information 81D. In the order management information 81D, these information items (or fields) are associated with each other as illustrated in FIG. 4.

Meanwhile, when receiving the message transmission request and the order results, the message transmission unit 14 obtains, via the transmission message management unit 15, display content information indicating order status of the respective types of toner (step S108). More specifically, the message transmission unit 14 sends the error identification information in the toner error information to the transmission message management unit 15, and thereby requests the transmission message management unit 15 to obtain the display content information from the message management information 91D.

The transmission message management unit 15 accesses the message management information storing unit 91 and obtains the display content information from the message management information 91D based on the error identification information for the respective types of toner.

In this exemplary process, the transmission message management unit 15 obtains character strings "Toner (black) has been ordered", "Toner (cyan) has been ordered", and "Toner (magenta) has been ordered" corresponding to the error identification information "E101", "E102", and "E103" of the respective types of toner (see FIG. 5). Then, the transmission message management unit 15 sends the obtained display content information to the transmission message management unit 15.

Then, based on the obtained display content information and the order identification information of the respective types of toner, the message transmission unit 14 generates a message indicating the order status of the toners (step S109). In this example, the message transmission unit 14 generates a message including three combinations of order identification information and display content information according to a predetermined data format. That is, the message transmission unit 14 generates a message that includes a combination of order identification information "TICKET4" and display content information "Toner (black) has been ordered", a combination of order identification information "TICKET5" and display content information "Toner (cyan) has been ordered", and a combination of order identification information "TICKET6" and display content information "Toner (magenta) has been ordered".

Then, the message transmission unit 14 sends the generated message to the requesting image processing apparatus 200, and thereby requests the requesting image processing apparatus 200 to display the order status (step S110).

The message reception unit 22 of the image processing apparatus 200 receives the message from the information processing apparatus 100 as a display request to display the order status. In response to the display request, the message reception unit 22 sends a transmission result to the information processing apparatus 100.

The message reception unit 22 requests the displaying unit 23 to display the order status based on the received message (step S111).

In response, the displaying unit 23 displays the character strings in the message indicating the order status of the respective types of toner on a display unit of the image processing apparatus 200 (step S112).

Figure 9:
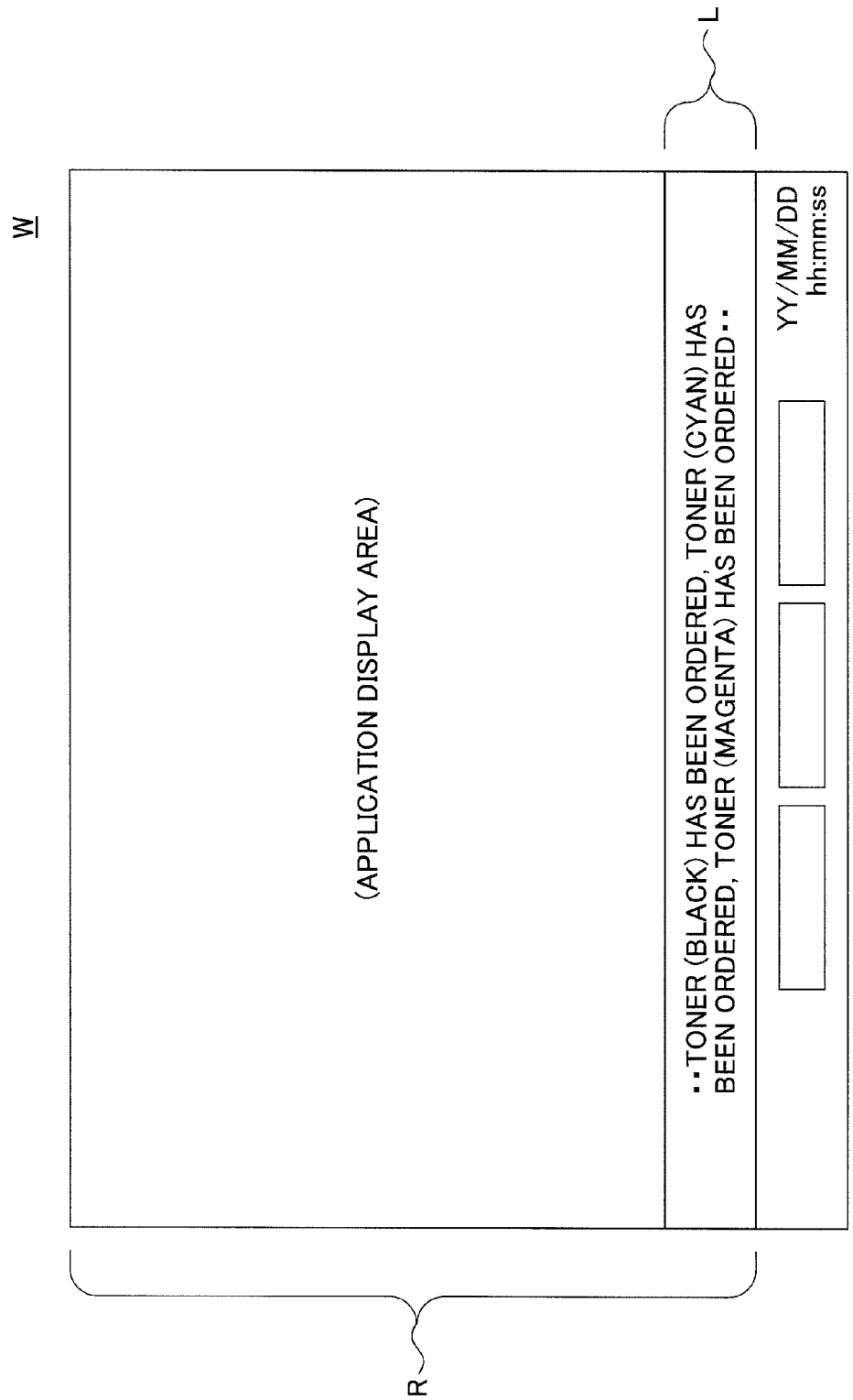
FIG. 9 is a drawing illustrating an exemplary order status displayed on a screen according to the first embodiment.

FIG. 9 is a drawing illustrating an exemplary order status displayed on a screen according to the first embodiment.

In FIG. 9, the order status "Toner (black) has been ordered, Toner (cyan) has been ordered, Toner (magenta) has been ordered" is displayed in an application display area R of a screen W. The application display area R is used to display, for example, an operation screen or a configuration screen of a running image processing function (application) of the image processing apparatus 200 which is assigned an exclusive right to the application display area R.

In the present embodiment, a display area L, which is used by the displaying unit 23 to display the character strings indicating the order status, is provided in the application display area R of the screen W. This configuration makes it possible to display the order status regardless of which one of the image processing functions of the image processing apparatus 200 is assigned the exclusive right to the application display area R. Still, the order status may also be displayed in any other manner. Also, instead of displaying the order status, the order status may be reported to the user using any other means such as audio.

Referring back to FIG. 8, when receiving the transmission result, the message transmission unit 14 of the information processing apparatus 100 requests the transmission message management unit 15 to add a transmission record (step S113). In this step, the message transmission unit 14 sends the apparatus identification information and the error identification information of the respective types of toner to the transmission message management unit 15.

When receiving the request, the transmission message management unit 15 accesses the transmission management information storing unit 92 and adds a transmission record in the transmission management information 92D for the requesting image processing apparatus 200 (step S114). More specifically, the transmission message management unit 15 adds the values of the apparatus identification information and the error identification information of the respective types of toner into the apparatus identifier field and the error identifier field of the transmission management information 92D.

For example, the transmission message management unit 15 adds "MFP003" as the apparatus identification information and "E101", "E102", and "E103" as the error identification information into the corresponding fields of the transmission management information 92D. In other words, as illustrated in FIG. 7, the transmission message management unit 15 records the error identification information corresponding to the order status being displayed at the image processing apparatus 200 in association with the identification information of the image processing apparatus 200.

As described above, the ordering system 1 of the present embodiment makes it possible to report the status of error support orders related to the image processing apparatuses 200 to the end users.

<Process for Displaying Updated Order Status>

Figure 10:
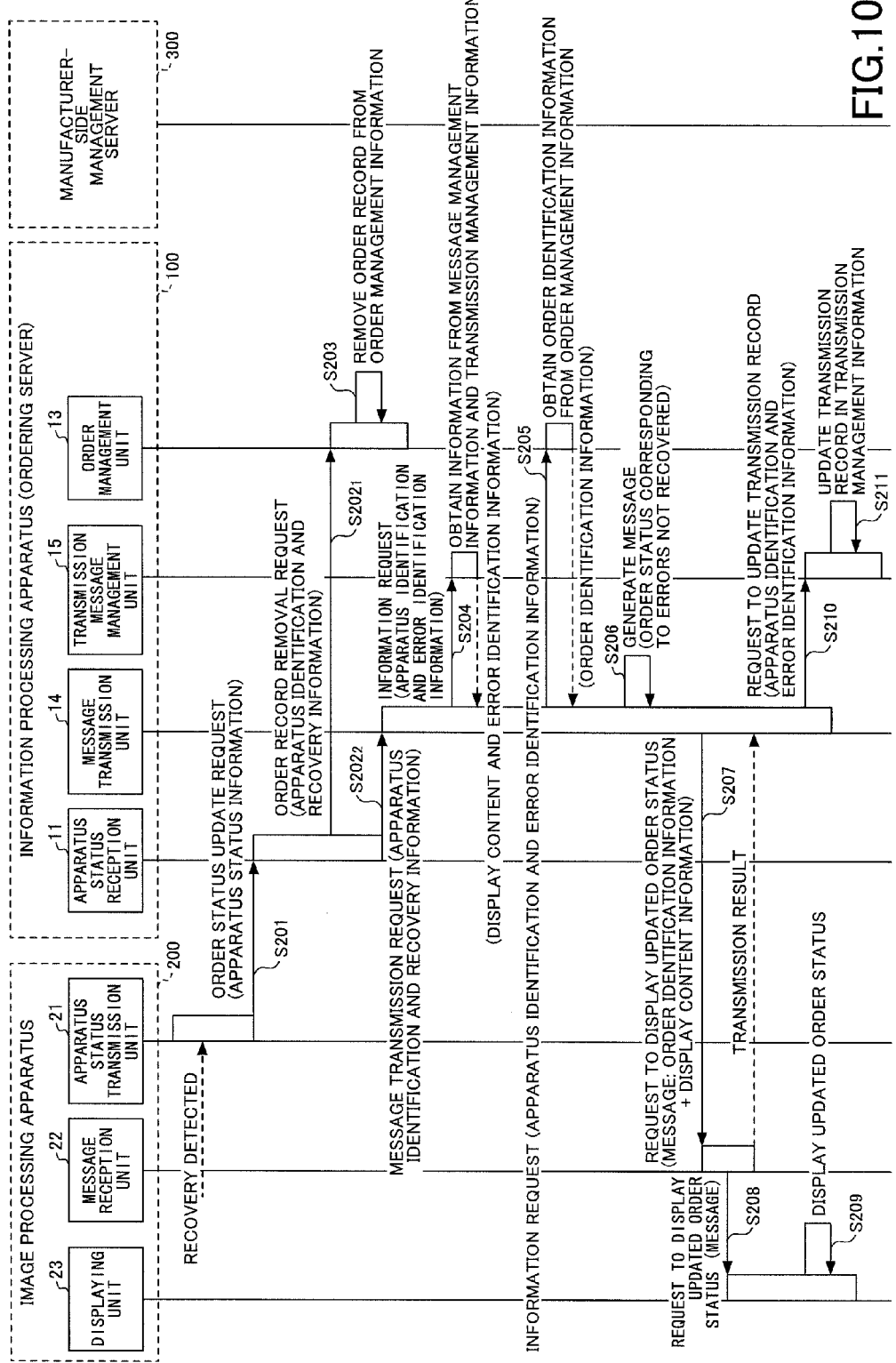
FIG. 10 is a sequence chart illustrating an exemplary process for displaying order status (message display updating process) according to the first embodiment.

FIG. 10 is a sequence chart illustrating an exemplary process for displaying order status (message display updating process) according to the first embodiment. In the process of FIG. 10, it is assumed that after black, cyan, and magenta toners of an image processing apparatus 200 represented by MFP003 are ordered, an error recovery of the black toner (i.e., an event that the black toner is supplied or refilled) is detected.

FIGS. 11A and 11B are drawings illustrating exemplary changes made to the order management information 81D and the transmission management information 92D as a result of the process illustrated in FIG. 10.

As illustrated in FIG. 10, when an error recovery of the black toner is detected, the apparatus status transmission unit 21 of the image processing apparatus 200 sends apparatus status information, as an order status update request, to the information processing apparatus 100 to request the information processing apparatus 100 to update order status based on the detected error recovery (step S201).

The apparatus status reception unit 11 of the information processing apparatus 100 receives the apparatus status information, i.e., the order status update request, from the image processing apparatus 200.

When receiving the order status update request, the apparatus status reception unit 11 requests the order management unit 13 to remove an order record of the black toner (step S202$_1$). In this step, the apparatus status reception unit 11 sends apparatus identification information and recovery information for the black toner in the apparatus status information to the order management unit 13.

Also, the apparatus status reception unit 11 requests the message transmission unit 14 to send a message indicating updated order status (step S202$_2$). In this step, the apparatus status reception unit 11 sends the apparatus identification information and the recovery information for the black toner in the apparatus status information to the message transmission unit 14 as a message transmission request.

When receiving the request, the order management unit 13 accesses the order management information storing unit 81 and removes the order record of the black toner from the order management information 81D (step S203). In this step, the order management unit 13 identifies the order record of the black toner in the order management information 81D based on the apparatus identification information and error identification information (e.g., the consumption status information of the black toner) in the recovery information. That is, the order management unit 13 searches the order management information 81D to find an order record whose error identifier and apparatus identifier fields contain values that match the values of the error identification information and the apparatus identification information, and removes the found order record.

In this example, the order management unit 13 removes an order record including "E101" as the error identification information and "MFP003" as the apparatus identification information. As a result, the order management information 81D is changed as illustrated in FIG. 11A (hatching indicates the removed order record).

Meanwhile, in response to the message transmission request, the message transmission unit 14 obtains, via the transmission message management unit 15, display content information indicating order status of toners whose error recoveries have not been detected (i.e., toners that have not been supplied/delivered/refilled yet; hereafter, for brevity, such toners may be called "undelivered" toners) (step S204). In this step, the message transmission unit 14 sends the apparatus identification information and the error identification information in the recovery information to the transmission message management unit 15, and thereby requests the transmission message management unit 15 to obtain the display content information from the message management information 91D.

More specifically, the message transmission unit 15 identifies, based on the apparatus identification information, error identification information in the transmission management information 92D which indicates toner errors corresponding to the order status currently being displayed at the image processing apparatus 200.

With the exemplary transmission management information 92D of FIG. 7, the transmission message management unit 15 identifies error identification information, i.e., identifiers "E101", "E102", and "E103", based on the apparatus identification information "MFP003".

Next, the transmission message management unit 15 identifies, based on the error identification information in the recovery information of the black toner, information items (i.e., identifiers) in the identified error identification information which correspond to the undelivered toners.

That is, the transmission message management unit 15 determines identifiers "E102" and "E103" corresponding to the cyan and magenta toners.

The transmission message management unit 15 accesses the message management information storing unit 91 and obtains the display content information indicating the order status of the undelivered toners from the message management information 91D based on the determined identifiers of the undelivered toners.

In this exemplary process, the transmission message management unit 15 obtains character strings "Toner (cyan) has been ordered" and "Toner (magenta) has been ordered" corresponding to the error identification information "E102" and "E103" of the toners (see FIG. 5).

Through the above process, the message transmission unit 14 obtains, via the transmission message management unit 15, the display content information indicating the order status of undelivered toners whose error recoveries have not been detected yet. Together with the display content information, the message transmission unit 14 also obtains the error identification information of the undelivered toners.

Next, the message transmission unit 14 obtains, via the order management unit 13, order identification information of the undelivered toners (step S205). In this step, the message transmission unit 14 sends the apparatus identification information and the error identification information of the undelivered toners to the order management unit 13.

The order management unit 13 accesses the order management information storing unit 81, and obtains the order identification information assigned to the orders of the undelivered toners from the updated order management information 81D (from which the order record of the black toner has been removed) based on the apparatus identification information and the error identification information of the undelivered toners.

In this exemplary process, the order management unit 13 obtains order identification information "TICKET5" and "TICKET6" based on the error identification information "E102" and "E103" and the apparatus identification information "MFP003" (see FIG. 11A).

Thus, the message transmission unit 14 obtains, via the order management unit 13, order identification information of the undelivered toners.

Then, based on the obtained display content information and the order identification information of the undelivered toners, the message transmission unit 14 generates a message indicating the updated order status (step S206). In this example, the message transmission unit 14 generates a message including two combinations of order identification information and display content information according to a predetermined data format. That is, the message transmission unit 14 generates a message that includes a combination of order identification information "TICKET5" and display content information "Toner (cyan) has been ordered" and a combination of order identification information "TICKET6" and display content information "Toner (magenta) has been ordered".

Then, the message transmission unit 14 sends the generated message to the image processing apparatus 200 that has sent the order status update request (hereafter, an image processing apparatus 200 that has sent an order status update request may be referred to as an "update-requesting image processing apparatus 200"), and thereby requests the update-requesting image processing apparatus 200 to display the updated order status (step S207).

The message reception unit 22 of the image processing apparatus 200 receives the message from the information processing apparatus 100 as a display request to display the updated order status. In response to the display request, the message reception unit 22 sends a transmission result to the information processing apparatus 100.

The message reception unit 22 requests the displaying unit 23 to display the updated order status based on the received message (step S208).

In response, the displaying unit 23 displays the character strings in the message indicating the order status of the undelivered toners on a display unit of the image processing apparatus 200 (or redraw the screen of the display unit with the updated order status) (step S209).

More specifically, the displaying unit 23 displays the character strings indicating the order status of the undelivered toners in the display area L of the application display area R.

When receiving the transmission result, the message transmission unit 14 of the information processing apparatus 100 requests the transmission message management unit 15 to update a transmission record (step S210). In this step, the message transmission unit 14 sends the apparatus identification information and the error identification information of the undelivered toners to the transmission message management unit 15.

When receiving the request, the transmission message management unit 15 accesses the transmission management information storing unit 92, and updates a transmission record in the transmission management information 92D which corresponds to the update-requesting image processing apparatus 200 (step S211). In this step, the transmission message management unit 15 identifies the corresponding transmission record in the transmission management information 92D based on the apparatus identification information. More specifically, the transmission message management unit 15 searches the transmission management information 92D to find a transmission record whose apparatus identifier field contains a value that matches the value of the apparatus identification information, and removes the error identification information corresponding to the black toner from the error identifier field of the found transmission record.

In this example, the transmission message management unit 15 removes the error identification information "E101" corresponding to the black toner from the error identifier field, which includes the error identification information "E101", "E102", and "E103", of the transmission record corresponding to the apparatus identification information "MFP003". As a result, the transmission management information 92D is updated as illustrated in FIG. 11B.

As described above, the ordering system 1 of the present embodiment makes it possible to report the updated status of error support orders to the image processing apparatuses 200 when error recoveries are detected.

Here, in steps S204 and S205 of FIG. 10, there may a case where the message transmitting unit 14 is unable to obtain display content information and/or order identification information.

For example, in step S204, when recoveries of errors corresponding to all error support orders from the image processing apparatus 200 are detected, the transmission message management unit 15 is unable to identify error identification information of errors that have not been recovered. When error identification information of errors that have not been recovered is not identified in step S204, step S205 is not performed. Accordingly, in this case, display content information and order identification information are not obtained.

When display content information and order identification information are not obtained, the message transmission unit 14 generates a blank message in step S206 of FIG. 10, and sends the blank message to the update-requesting image processing apparatus 200 in step S207.

In response to the blank message, the image processing apparatus 200 displays, in step S209, a "blank" display area L, where no character string indicating the order status is displayed, in the application display area R.

<Summary>

As described above, the apparatus status reception unit 11 of the information processing apparatus 100 of the present embodiment receives, as an order request, apparatus status information including a status change such as a shortage or wear of a consumable or occurrence of a failure from the image processing apparatus 200. Then, in response to the order request, the ordering unit 12 of the information processing apparatus 100 places an error support order to the manufacturer-side management server 300. When an order result is received from the manufacturer-side management server 300, the message transmission unit 14 of the information processing apparatus 100 sends a message indicating order status to the image processing apparatus 200 that has sent the order request, and thereby requests the image processing apparatus 200 to display the order status.

With the above configuration, the information processing apparatus 100 of the present embodiment makes it possible to report the status of error support orders related to an electronic apparatus to the end user. This in turn makes it possible to prevent duplicate error support orders.

<Variation>

With the configuration of the above embodiment, the image processing apparatus 200 detects an error recovery and requests the information processing apparatus 100 to update order status. This configuration makes it possible to update the order status immediately or in real time. Still, however, the present invention is not limited to the above embodiment.

FIG. 12 is a drawing illustrating an exemplary functional configuration of the ordering system 1 according to a variation of the first embodiment.

As illustrated in FIG. 12, the information processing apparatus 100 of this variation further includes an order status monitoring unit 16.

The order status monitoring unit 16 is a functional unit that monitors the status of error support orders. The order status monitoring unit 16 queries the manufacturer-side management server 300 about the status of error support orders according to a predetermined schedule. Here, "predetermined schedule" indicates the timing when the order status monitoring unit 16 queries the manufacturer-side management server 300. For example, the predetermined schedule may be defined by a parameter (or a setting) indicating start time or an interval at which the order status monitoring unit 16 operates.

The order status monitoring unit 16 queries the manufacturer-side management server 300 about the current status of error support orders based on order identification information in the order management information 81D. Based on query results from the manufacturer-side management server 300, the order status monitoring unit 16 identifies order identification information in the order management information 81D which corresponds to error support orders that have been completed or corresponds to errors that have been recovered (hereafter, such error support orders may be referred to as "completed" error support orders). As a result, the order status monitoring unit 16 also identifies order identification information of error support orders that have not been completed yet or correspond to errors that have not been recovered (hereafter, such error support orders may be referred to as "uncompleted" error support orders). For example, a "completed" error support order for a consumable indicates that the consumable has been delivered (shipped or supplied) to the user environment EU. Meanwhile, a "completed" error support order for a troubleshooting service indicates that a serviceperson has been sent to the user environment EU.

Based on the identified order identification information, the order status monitoring unit 16 requests the order management unit 13 to remove order records corresponding to the completed error support orders, and also requests the message transmission unit 14 to send a message indicating updated order status.

Thus, with the configuration of this variation, the information processing apparatus 100 collaborates with the manufacturer-side management server 300 to confirm the status of error support orders of the image processing apparatuses 200 in the order management information 81D, and requests the image processing apparatuses 200 to display updated order status based on the confirmation results.

An exemplary process (collaboration among the functional units) of updating order status according to this variation is described below.

<Process for Displaying Updated Order Status>

Figure 13:
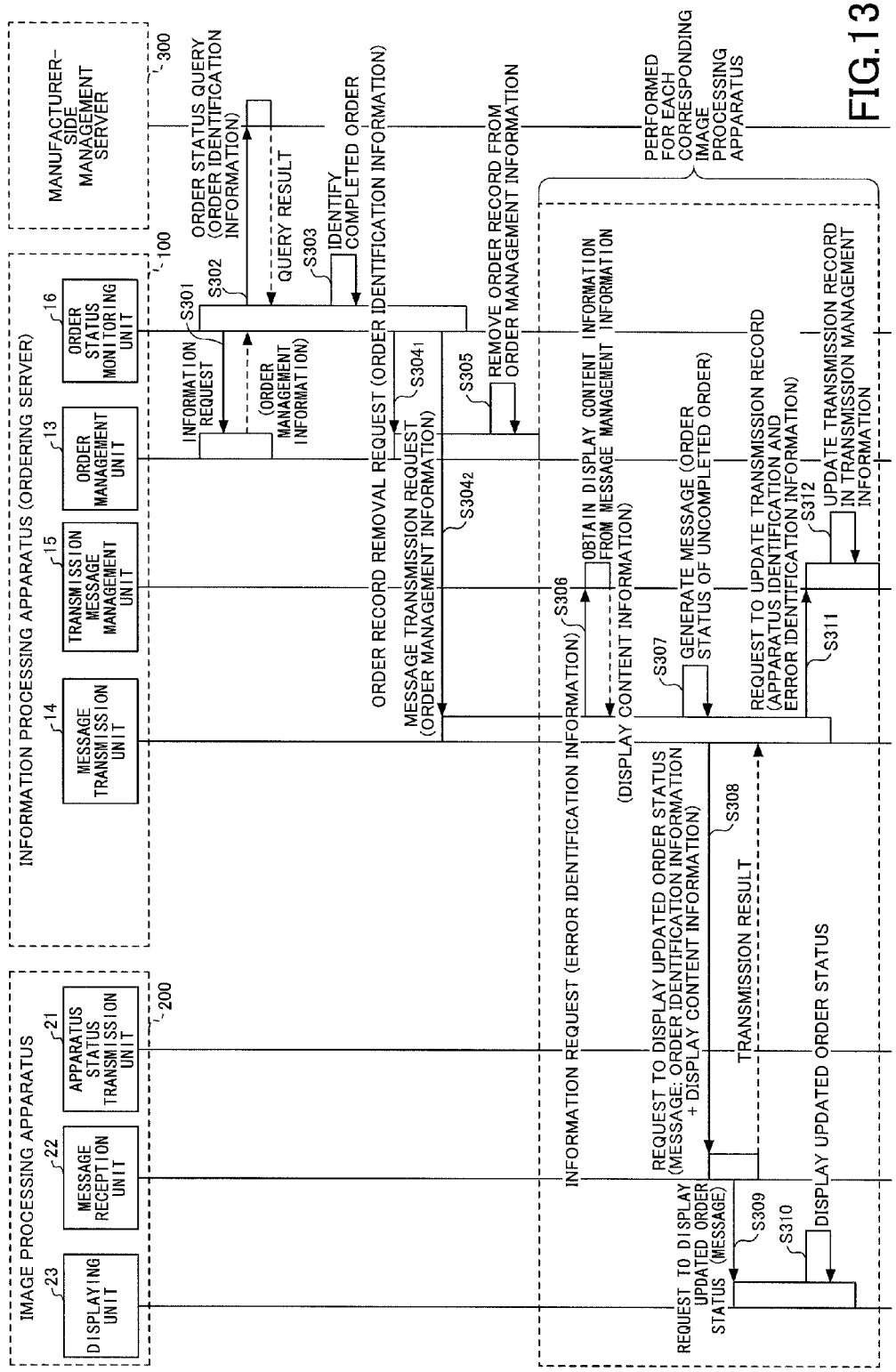
FIG. 13 is a sequence chart illustrating an exemplary process of displaying the status of orders (message display updating process) according to a variation of the first embodiment.

FIG. 13 is a sequence chart illustrating an exemplary process for displaying order status (message display updating process) according to a variation of the first embodiment.

As illustrated in FIG. 13, the order status monitoring unit 16 of the information processing apparatus 100 performs a process as described below according to a predetermined schedule.

The order status monitoring unit 16 obtains, via the order management unit 13, the order management information 81D currently stored in the order management information storing unit 81 (step S301).

The order status monitoring unit 16 sends order identification information in the obtained order management information 81D to the manufacturer-side management server 300, and thereby queries the manufacturer-side management server 300 about the current status of error support orders (step S302).

The order status monitoring unit 16 receives query results from the manufacturer-side management server 300. The query results may include values indicating the current status of the error support orders in association with the order identification information.

When receiving the query results, the order status monitoring unit 16 identifies order identification information in the order management information 81D corresponding to completed error support orders (step S303).

Based on the identified order identification information, the order status monitoring unit 16 requests the order management unit 13 to remove order records corresponding to the completed error support orders (step $S304_1$). In this step, the order status monitoring unit 16 sends the order identification information corresponding to the completed error support orders to the order management unit 13.

Based also on the identified order identification information, the order status monitoring unit 16 requests the message transmission unit 14 to send a message indicating updated order status (step $S304_2$). In this step, the order status monitoring unit 16 sends the order management information 81D corresponding to uncompleted error support orders to the message transmission unit 14.

When receiving the request, the order management unit 13 accesses the order management information storing unit 81 and removes order records corresponding to the completed error support orders from the order management information 81D (step S305). In this step, the order management unit 13 identifies the corresponding order records in the order management information 81D based on the order identification information received from the order status monitoring unit 16. More specifically, the order management unit 13 searches the order management information 81D to find order records whose order identifier fields contain values that match the values of the received order identification information, and removes the found order records.

Meanwhile, when receiving the request, the message transmission unit 14 performs a process as described below for each image processing apparatus 200 having one or more uncompleted error support orders. The message transmission unit 14 identifies such an image processing apparatus 200 based on the apparatus identification information in the order management information 81D corresponding to the uncompleted error support orders.

The message transmission unit 14 obtains, via the transmission message management unit 15, display content information indicating the order status of the uncompleted error support orders (step S306). More specifically, the message transmission unit 14 sends the error identification information in the order management information 81D corresponding to the uncompleted error support orders to the transmission message management unit 15, and thereby requests the transmission message management unit 15 to obtain the display content information from the message management information 91D.

The transmission message management unit 15 accesses the message management information storing unit 91 and obtains the display content information from the message management information 91D based on the error identification information corresponding to the uncompleted error support orders.

Then, the transmission message management unit 15 sends the obtained display content information to the transmission message management unit 15.

Then, based on the obtained display content information and the order identification information of the uncompleted error support orders, the message transmission unit 14 generates a message indicating updated order status (step S307).

Then, the message transmission unit 14 sends the generated message to the image processing apparatus 200 identified based on the apparatus identification information, and thereby requests the image processing apparatus 200 to display the updated order status (step S308).

The message reception unit 22 of the image processing apparatus 200 receives the message from the information processing apparatus 100 as a display request to display the updated order status. In response to the display request, the message reception unit 22 sends a transmission result to the information processing apparatus 100.

The message reception unit 22 requests the displaying unit 23 to display the updated order status based on the received message (step S309).

In response, the displaying unit 23 displays character strings in the message indicating the order status of the uncompleted error support orders on a display unit of the image processing apparatus 200 (step S310).

When receiving the transmission result, the message transmission unit 14 of the information processing apparatus 100 requests the transmission message management unit 15 to update a transmission record (step S311). In this step, the message transmission unit 14 sends the apparatus identification information and the error identification information corresponding to the uncompleted error support orders to the transmission message management unit 15.

When receiving the request, the transmission message management unit 15 accesses the transmission management information storing unit 92 and updates a transmission record in the transmission management information 92D which corresponds to the image processing apparatus 200 identified based on the apparatus identification information (step S312). In this step, the transmission message management unit 15 identifies the corresponding transmission record in the transmission management information 92D based on the apparatus identification information. More specifically, the transmission message management unit 15 searches the transmission management information 92D to find a transmission record whose apparatus identifier field contains a value that matches the value of the apparatus identification information, and removes error identification information other than the error identification information corresponding to the uncompleted error support orders (i.e., error identification information of the completed error support orders) from the error identifier field of the found transmission record.

As described above, the ordering system 1 of this variation makes it possible to update order status displayed at the image processing apparatuses 200 based on current status of error support orders at the manufacturer-side management server 300.

<<Second Embodiment>>

In a second embodiment, a technology for reporting detailed order status of error support orders is described. In the second embodiment, descriptions overlapping those in the first embodiment are omitted, and the same reference numbers as those used in the first embodiment are assigned to the corresponding components.

<Order Management Function>

Figure 14:
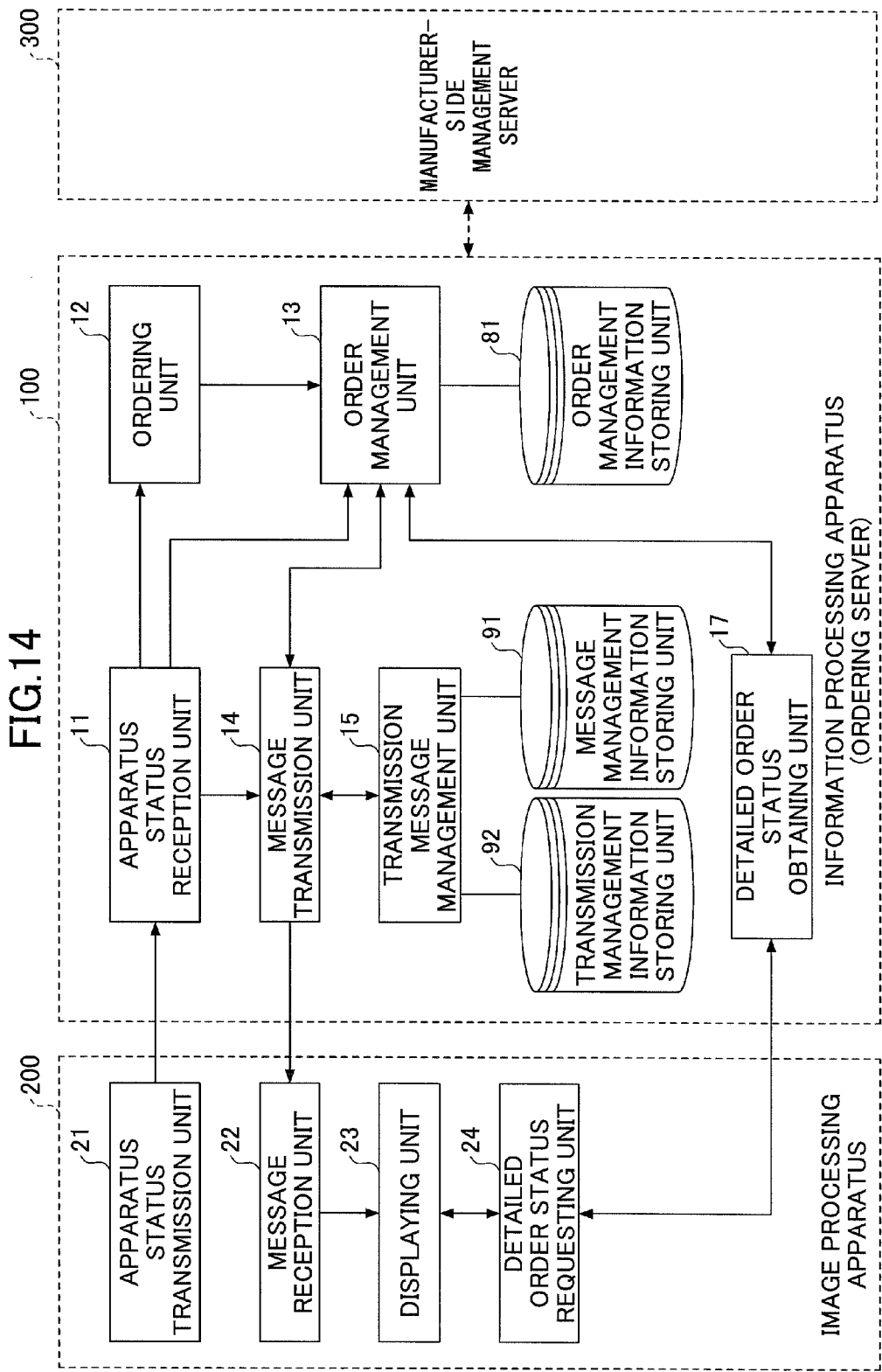
FIG. 14 is a drawing illustrating an exemplary functional configuration of an ordering system according to a second embodiment.

FIG. 14 is a drawing illustrating an exemplary functional configuration of the ordering system 1 according to the second embodiment.

As illustrated in FIG. 14, the information processing apparatus 100 of the second embodiment further includes a detailed order status obtaining unit 17 and the image processing apparatus 200 further includes a detailed order status requesting unit 24 that collaborates with the detailed order status obtaining unit 17.

<Functional Units of Image Processing Apparatus>

The detailed order status requesting unit 24 is a functional unit that requests the information processing apparatus 100 to obtain detailed order status. The detailed order status requesting unit 24 requests the information processing apparatus 100 to obtain detailed order status of error support orders whose order status is being displayed at the image processing apparatus 200, in response to a user operation. More specifically, the detailed order status requesting unit 24 sends the apparatus identification information of the corresponding image processing apparatus 200, where the detailed order status requesting unit 24 is running, to the information processing apparatus 100 to request detailed order status.

The user operation is received by the displaying unit 23. The displaying unit 23 detects an operation event corresponding to a user operation on the screen W displayed on the display unit of the image processing apparatus 200, and determines the type of the user operation based on the operation event.

For example, the displaying unit 23 determines that an operation to request detailed order status is performed when a user input in the display area L on the screen W is detected. Alternatively, the displaying unit 23 may be configured to determine that an operation to request detailed order status is performed when a graphical user interface (GUI) component (e.g., a DETAIL button) provided in the display area L is pressed.

In response to the operation to request detailed order status, the detailed order status requesting unit 24 sends a detailed order status request to request the information processing apparatus 100 to obtain detailed order status. When receiving the detailed order status (detailed order status information) from the information processing apparatus 100, the detailed order status requesting unit 24 requests the displaying unit 23 to display the received detailed order status information on the display unit. An exemplary screen displayed by the displaying unit 23 is described later.

<Functional Units of Information Processing Apparatus>

The detailed order status obtaining unit 17 is a functional unit that obtains detailed order status of error support orders. When receiving a request to obtain detailed order status, the detailed order status obtaining unit 17 sends order identification information to the manufacturer-side management server 300 to request information (detailed order status information) indicating detailed order status of error support orders.

More specifically, the detailed order status obtaining unit 17 receives the apparatus identification information from the image processing apparatus 200 as a request to obtain detailed order status. Based on the apparatus identification information, the detailed order status obtaining unit 17 obtains the corresponding order identification information from the order management information 81D. Then, the detailed order status obtaining unit 17 sends the obtained order identification information to the manufacturer-side management server 300, and thereby obtains detailed order status information being managed in association with the order identification information from the manufacturer-side management server 300.

The detailed order status information may include information indicating the current status of error support orders (e.g., character strings or values indicating phases in a process of handling an error support order).

The detailed order status requesting unit 17 sends the obtained detailed order status information to the image processing apparatus 200 as a response to the request.

Thus, in the second embodiment, the information processing apparatus 100 obtains detailed order status of error support orders from the manufacturer-side management server 300, and sends the obtained detailed order status to the image processing apparatus 200.

An exemplary process (collaboration among the functional units) performed to provide the order management function of the second embodiment is described below.

<Process for Displaying Detailed Order Status>

Figure 15:
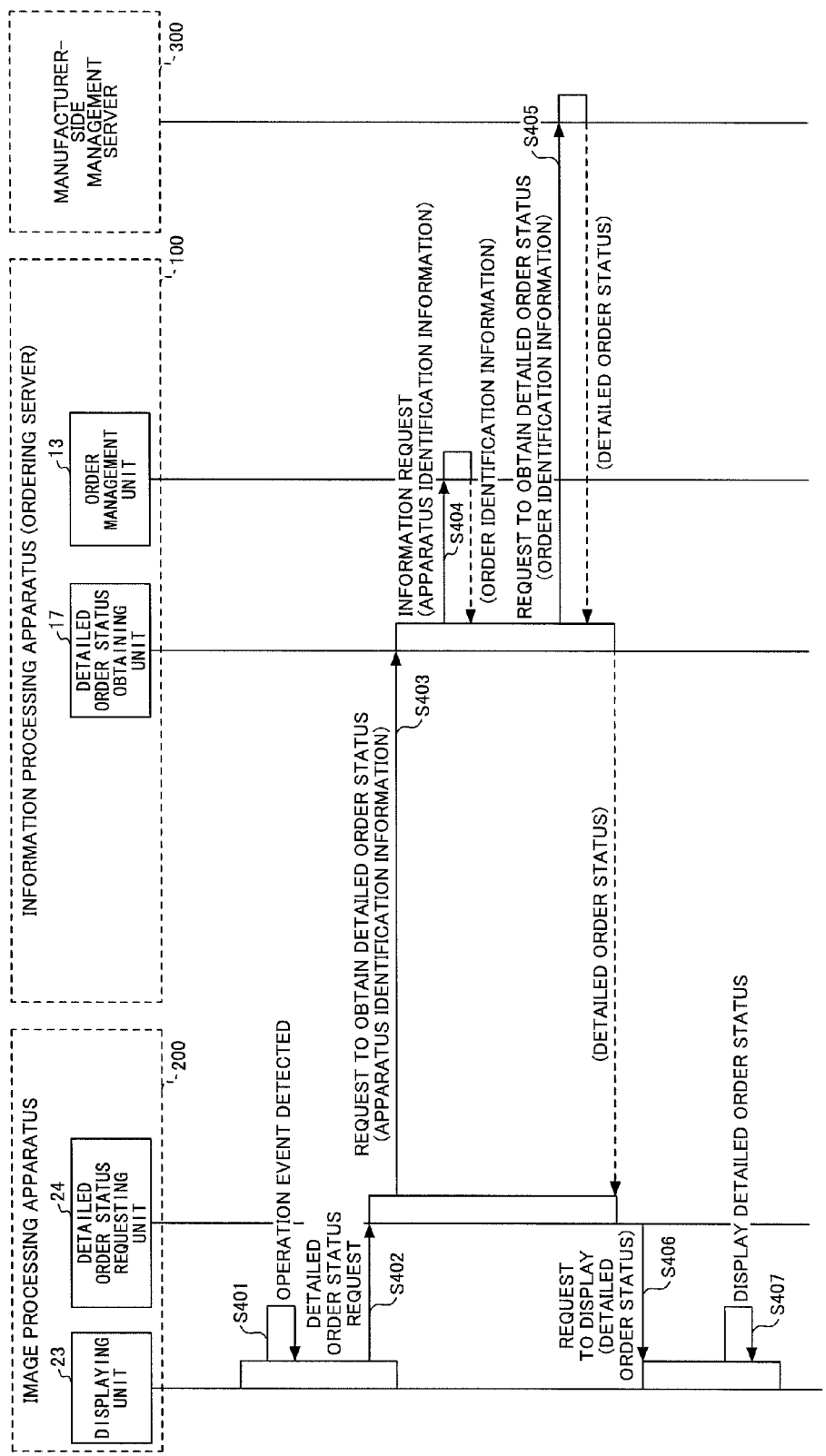
FIG. 15 is a sequence chart illustrating an exemplary process of displaying detailed order status according to the second embodiment.

FIG. 15 is a sequence chart illustrating an exemplary process of displaying detailed order status according to the second embodiment. In the process of FIG. 15, it is assumed that the screen W of FIG. 9 is displayed on the image processing apparatus 200 as a result of the process of FIG. 8.

As illustrated in FIG. 15, the displaying unit 23 of the image processing apparatus 200 detects an operation event corresponding to a user operation on the screen W (step S401). Based on the detected operation event, the displaying unit 23 determines that an operation to request detailed order status has been performed.

In response to the operation, the displaying unit 23 sends a detailed order status request to the detailed order status requesting unit 24 (step S402).

In response to the detailed order status request, the detailed order status requesting unit 24 sends the apparatus identification information of the corresponding image processing apparatus 200 to the information processing apparatus 100 to request detailed order status (step S403).

The detailed order status obtaining unit 17 of the information processing apparatus 100 receives the apparatus identification information from the image processing apparatus 200 as a request to obtain detailed order status.

In response to the request, the detailed order status obtaining unit 17 obtains, via the order management unit 13, order identification information of error support orders of the image processing apparatus 200 from the order management information 81D (step S404). In this step, the detailed order status obtaining unit 17 sends the apparatus identification information to the order management unit 13.

The order management unit 13 accesses the order management information storing unit 81 and obtains the order identification information corresponding to the apparatus identification information from the order management information 81D.

In this exemplary process, the order management unit 13 obtains order identification information "TICKET4", "TICKET5", and "TICKET6" corresponding to the apparatus identification information "MFP003" (see FIG. 4). Through the above process, the detailed order status obtaining unit 17 obtains, via the order management unit 13, order identification information of error support orders of the image processing apparatus 200.

Based on the obtained order identification information, the detailed order status obtaining unit 17 obtains detailed order status from the manufacturer-side management server 300 (step S405). In this step, the detailed order status obtaining unit 17 sends the order identification information to the manufacturer-side management server 300.

The detailed order status obtaining unit 17 receives detailed order status information as described below from the manufacturer-side management server 300 as a response to the order identification information. For example, the detailed order status obtaining unit 17 receives detailed order status information indicating the current status of orders for toners (e.g., character strings indicating detailed order status of orders for toners) placed by the image processing apparatus 200. Then, the detailed order status obtaining unit 17 sends the obtained detailed order status information to the image processing apparatus 200 as a response to the request.

The detailed order status requesting unit 24 of the image processing apparatus 200 receives the detailed order status information from the information processing apparatus 100.

The detailed order status requesting unit 24 requests the displaying unit 23 to display the detailed order status information (step S406).

In response, the displaying unit 23 displays the character strings in the detailed order status information indicating the detailed order status of the toners on the display unit of the image processing apparatus 200 (step S407).

Figure 16:
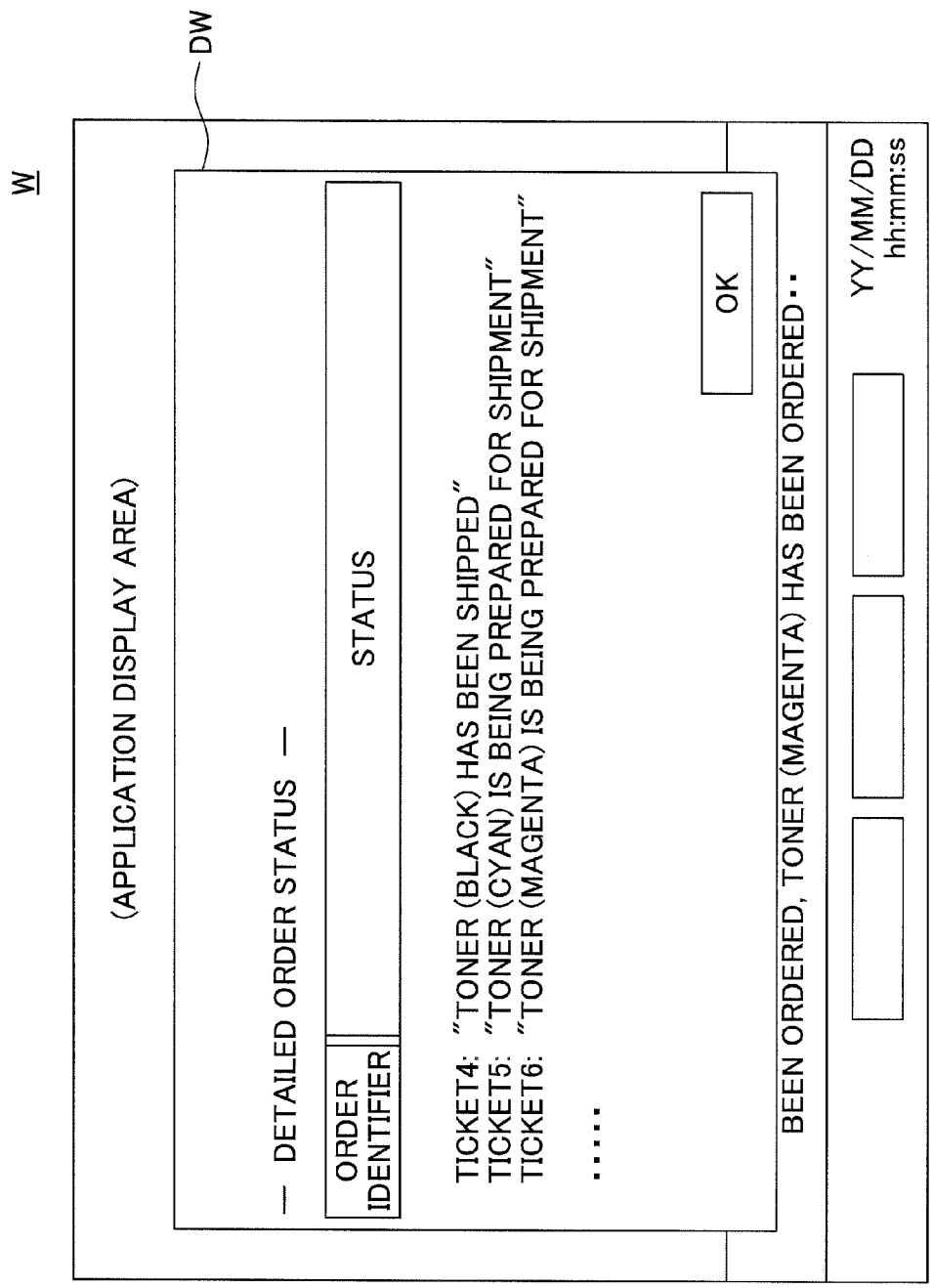
FIG. 16 is a drawing illustrating an exemplary detailed order status displayed on a screen according to the second embodiment.

FIG. 16 is a drawing illustrating exemplary detailed order status displayed on a screen according to the second embodiment.

In FIG. 16, the detailed order status of black, cyan, and magenta toners is displayed in the application display area R of the screen W.

In the second embodiment, the displaying unit 23 displays the character strings indicating the detailed order status in a window DW that is superposed on the application display area R. However, the detailed order status may also be displayed in any other manner. Also, instead of displaying the detailed order status, the detailed order status may be reported to the user using any other means such as audio.

As described above, the ordering system 1 of the second embodiment makes it possible to report order status of error support orders of the image processing apparatuses 200 to the end users, and also makes it possible to report more detailed order status of the error support orders.

In the exemplary process described above, the apparatus identification information is sent from the image processing apparatus 200 to the information processing apparatus 100 to request the information processing apparatus 100 to obtain detailed order status. That is, detailed order status is obtained in units of the image processing apparatuses 200. However, the present invention is not limited to the above described embodiment. For example, the image processing apparatus 200 may be configured to send error identification information to the information processing apparatus 100 to obtain detailed order status for a specific error type. In this case, for example, when a DETAIL button on the screen W is pressed, the displaying unit 23 displays errors (error information) corresponding to error support orders placed by the image processing apparatus 200. When one or more of the displayed errors are selected, the displaying unit 23 requests the detailed order status requesting unit 24 to obtain detailed order status corresponding to the selected errors.

Then, the detailed order status requesting unit 24 obtains error identification information corresponding to the selected errors from the order management information 81D and sends the obtained error identification information to the information processing apparatus 100.

<Summary>

As described above, the apparatus status reception unit 11 of the information processing apparatus 100 of the present embodiment receives, as an order request, apparatus status information including a status change such as a shortage or wear of a consumable or occurrence of a failure from the image processing apparatus 200. Then, in response to the order request, the ordering unit 12 of the information processing apparatus 100 places an error support order to the manufacturer-side management server 300. When an order result is received from the manufacturer-side management server 300, the message transmission unit 14 of the information processing apparatus 100 sends a message indicating order status to the requesting image processing apparatus 200, and thereby requests the image processing apparatus 200 to display the order status.

Also, in response to a request to obtain detailed order status of error support orders from the image processing apparatus 200, the detailed order status obtaining unit 17 of the information processing apparatus 100 obtains detailed order status information indicating the detailed order status of the error support orders from the manufacturer-side management server 300. Next, the detailed order status obtaining unit 17 sends the obtained detailed order status information to the image processing apparatus 200. Then, the image processing apparatus 200 displays the detailed order status information on the display unit.

With the above configuration, the information processing apparatus 100 of the present embodiment makes it possible to report the order status as well as the detailed order status of error support orders of an electronic apparatus to the end user.

<Variation>

As described above, FIG. 12 illustrates a functional configuration where the information processing apparatus 100 collaborates with the manufacturer-side management server 300 to confirm the status of error support orders of the image processing apparatuses 200, and requests the image processing apparatuses 200 to display updated order status based on the confirmation results.

In a variation of the second embodiment, detailed order status of error support orders is reported using the functional configuration of FIG. 12.

Figure 17:
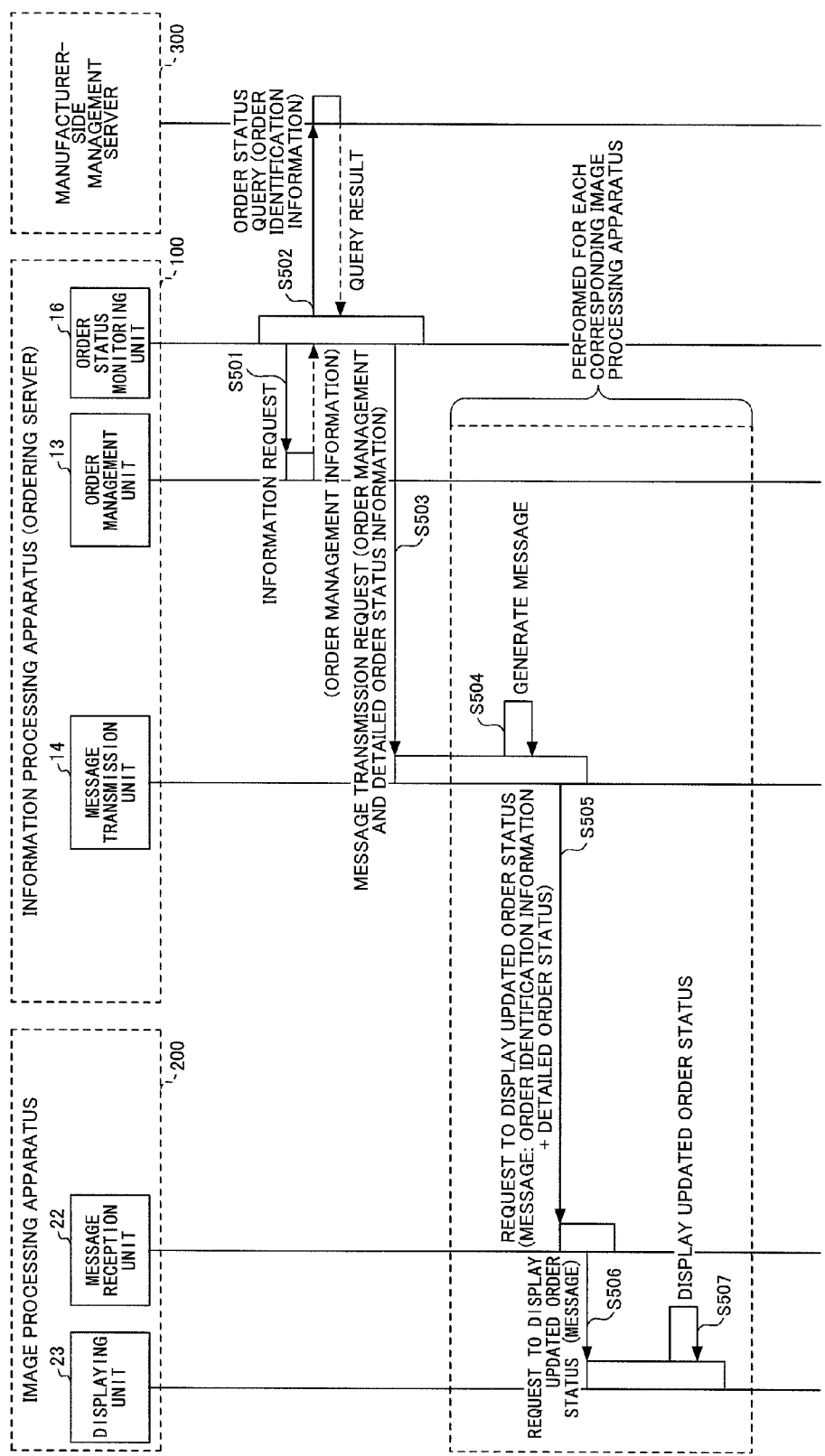
FIG. 17 is a sequence chart illustrating an exemplary process of displaying detailed order status according to a variation of the second embodiment.

FIG. 17 is a sequence chart illustrating an exemplary process of displaying detailed order status according to a variation of the second embodiment.

As illustrated in FIG. 17, the order status monitoring unit 16 of the information processing apparatus 100 performs a process as described below according to a predetermined schedule.

The order status monitoring unit 16 obtains, via the order management unit 13, the order management information 81D currently stored in the order management information storing unit 81 (step S501).

The order status monitoring unit 16 sends order identification information in the obtained order management information 81D to the manufacturer-side management server 300, and thereby queries the manufacturer-side management server 300 about the current status of error support orders (step S502).

The order status monitoring unit 16 receives query results from the manufacturer-side management server 300. In this case, the query results include detailed order status information indicating the detailed order status of the error support orders corresponding to the order identification information.

When receiving the detailed order status information, the order status monitoring unit 16 requests the message transmission unit 14 to send a message indicating the detailed order status (step S503). In this step, the order status monitoring unit 16 sends the order management information 81D and the detailed order status information to the message transmission unit 14.

When receiving the request, the message transmission unit 14 performs a process as described below for each image processing apparatus 200 having one or more pending error support orders. The message transmission unit 14 identifies such an image processing apparatus 200 based on the apparatus identification information in the order management information 81D.

Based on the detailed order status information and the order management information 81D, the message transmission unit 14 generates a message indicating the detailed order status (step S504).

Then, the message transmission unit 14 sends the generated message to the image processing apparatus 200 identified based on the apparatus identification information, and thereby requests the image processing apparatus 200 to display updated order status (detailed order status) (step S505).

The message reception unit 22 of the image processing apparatus 200 receives the message from the information processing apparatus 100 as a display request to display the updated order status.

The message reception unit 22 requests the displaying unit 23 to display the updated order status based on the received message (step S506).

In response, the displaying unit 23 displays character strings in the message indicating the detailed order status of the error support orders on the display unit of the image processing apparatus 200 (step S507). As a result, information displayed on the screen W changes, for example, as illustrated by FIGS. 18A and 18B.

FIG. 18A illustrates the screen W that is displayed after the process of FIG. 8 is performed, and is substantially the same as the screen W of FIG. 9.

When the process of FIG. 17 is performed, character strings indicating detailed order status are displayed in the display area L of the application display area R, and as a result, the order status displayed in the display area L is updated as illustrated in FIG. 18B.

As described above, the ordering system 1 of this variation makes it possible to report detailed order status to the image processing apparatuses 200 based on the current status of error support orders at the manufacturer-side management server 300, and also makes it possible to update the detailed order status at predetermined intervals.

The order management function of the above embodiments may be implemented, for example, by executing a program(s), which is written in a programming language supported by the operating environment (platform) of the information processing apparatus 100, using a processing unit (i.e., the CPU 106) of the information processing apparatus 100.

Such a program may be stored in a non-transitory computer-readable storage medium (e.g., the storage medium 103a) such as a floppy (flexible) disk (FD), a compact disk (CD), a digital versatile disk (DVD), a secure digital (SD) memory card, and a universal serial bus (USB) memory. For example, the program stored in the storage medium 103a may be installed in the information processing apparatus 100 via the drive unit 103. Alternatively, the program may be downloaded and installed via a telecommunication line and the interface unit 107 into the information processing apparatus 100. Similarly, the functional units of the image processing apparatus 200 may be implemented by executing a program(s) by a processing unit of the image processing apparatus 200.

An information processing apparatus, an ordering system, and an order management method are described above as preferred embodiments. However, the present invention is not limited to the specifically disclosed embodiments, and variations and modifications may be made without departing from the scope of the present invention.

An aspect of this disclosure provides an information processing apparatus, an ordering system, and an order management method that make it possible to report order status of error support orders related to an electronic apparatus to the end users.

What is claimed is:

1. An information processing apparatus connected via a data communication channel to at least one electronic apparatus and a server, the information processing apparatus comprising:
   an apparatus status reception unit configured to receive, from the electronic apparatus, apparatus status information including an apparatus status detected at the electronic apparatus and an apparatus identifier for identifying the electronic apparatus;
   an order management information storing unit configured to store order management information where order identifiers for identifying orders, error identifiers for identifying errors, and apparatus identifiers for identifying electronic apparatuses are associated with each other;
   a determining unit configured, when the received apparatus status information includes error information indicating an error detected at the electronic apparatus and an order request, to determine an order item to be ordered;
   an ordering unit configured to generate order information including the apparatus identifier and the error information in the received apparatus status information based on the determined order item and send the order information to the server;
   an order identifier receiving unit configured to receive an order identifier from the server in response to the order information;
   an order management unit configured to add an order record to the order management information, the order record including the order identifier received from the server, an error identifier corresponding to the error information, and the apparatus identifier that are associated with each other;
   a message management information storing unit configured to store message management information where message content information is associated with error types;
   a message content information obtaining unit configured to obtain the message content information corresponding to an error type of the error information from the message management information storing unit;
   a message generating unit configured to generate a message including the obtained message content information and the order identifier; and
   a message transmission unit configured to send the message to the electronic apparatus sending the apparatus status information and request the electronic apparatus to display the message.

2. The information processing apparatus as claimed in claim 1, further comprising:
   a transmission management information storing unit configured to store transmission management information where the apparatus identifiers and the error identifiers are associated with each other;
   a transmission message management unit configured to add a transmission record including the apparatus identifier of the electronic apparatus to which the message is sent and the error identifier corresponding to the message content information included in the message;
   an order management information updating unit configured, when the received apparatus status information includes recovery information indicating recovery from the error detected at the electronic apparatus and an order status update request, to remove the order record corresponding to the apparatus identifier in the apparatus status information and the error identifier of the error indicated by the recovery information from the order management information stored in the order management information storing unit; and a transmission management information updating unit configured to remove the transmission record corresponding to the apparatus identifier in the apparatus status information and the error identifier of the error indicated by the recovery information from the transmission management information stored in the transmission management information storing unit, wherein the message generating unit is configured to identify, from the transmission management information, the error identifier corresponding to the apparatus identifier of the electronic apparatus sending the apparatus status information including the recovery information and generate a message indicating an updated order status based on the identified error identifier, and wherein the message transmission unit is configured to send the message indicating the updated order status to the electronic apparatus sending the apparatus status information including the order status update request and request the electronic apparatus to display the message indicating the updated order status.

3. The information processing apparatus as claimed in claim 2, further comprising:

an order status monitoring unit configured to query the server about current status of the orders based on the order identifiers in the order management information, wherein the order management information updating unit is configured to identify the order identifiers corresponding to errors that have been recovered based on results of the query sent from the server and remove order records corresponding to the identified order identifiers from the order management information.

4. The information processing apparatus as claimed in claim 3, wherein the message generating unit is configured to generate messages indicating the updated order status based on the order management information after the order records are removed; and the message transmission unit is configured to send the generated messages to the corresponding electronic apparatuses and request the electronic apparatuses to display the messages.

5. The information processing apparatus as claimed in claim 2, further comprising:

a detailed order status request receiving unit configured to receive the apparatus identifier and a detailed order status request from the electronic apparatus;

a detailed order status obtaining unit configured to identify the order identifiers in the order management information corresponding to the received apparatus identifier and obtain detailed order status information corresponding to the identified order identifiers from the server; and a detailed order status information transmitting unit configured to send the obtained detailed order status information to the electronic apparatus.

6. An ordering system, comprising:
at least one electronic apparatus;
a server; and
an information processing apparatus connected via a data communication channel to the electronic apparatus and the server, wherein the information processing apparatus includes
an apparatus status reception unit configured to receive, from the electronic apparatus, apparatus status information including an apparatus status detected at the electronic apparatus and an apparatus identifier for identifying the electronic apparatus, an order management information storing unit configured to store order management information where order identifiers for identifying orders, error identifiers for identifying errors, and apparatus identifiers for identifying electronic apparatuses are associated with each other, a determining unit configured, when the received apparatus status information includes error information indicating an error detected at the electronic apparatus and an order request, to determine an order item to be ordered, an ordering unit configured to generate order information including the apparatus identifier and the error information in the received apparatus status information based on the determined order item and send the order information to the server, an order identifier receiving unit configured to receive an order identifier from the server in response to the order information, an order management unit configured to add an order record to the order management information, the order record including the order identifier received from the server, an error identifier corresponding to the error information, and the apparatus identifier that are associated with each other, a message management information storing unit configured to store message management information where message content information is associated with error types, a message content information obtaining unit configured to obtain the message content information corresponding to an error type of the error information from the message management information storing unit, a message generating unit configured to generate a message including the obtained message content information and the order identifier, and a message transmission unit configured to send the message to the electronic apparatus sending the apparatus status information and request the electronic apparatus to display the message.

7. The ordering system as claimed in claim 6, wherein the information processing apparatus further includes a transmission management information storing unit configured to store transmission management information where the apparatus identifiers and the error identifiers are associated with each other;

a transmission message management unit configured to add a transmission record including the apparatus identifier of the electronic apparatus to which the message is sent and the error identifier corresponding to the message content information included in the message;

an order management information updating unit configured, when the received apparatus status information includes recovery information indicating recovery from the error detected at the electronic apparatus and an order status update request, to remove the order record corresponding to the apparatus identifier in the apparatus status information and the error identifier of the error indicated by the recovery information from the order management information stored in the order management information storing unit; and
a transmission management information updating unit configured to remove the transmission record corresponding to the apparatus identifier in the apparatus status information and the error identifier of the error indicated by the recovery information from the transmission management information stored in the transmission management information storing unit,
wherein the message generating unit is configured to identify, from the transmission management information, the error identifier corresponding to the apparatus identifier of the electronic apparatus sending the apparatus status information including the recovery information and generate a message indicating an updated order status based on the identified error identifier, and
wherein the message transmission unit is configured to send the message indicating the updated order status to the electronic apparatus sending the apparatus status information including the order status update request and request the electronic apparatus to display the message indicating the updated order status.

8. The ordering system as claimed in claim 7, wherein the information processing apparatus further includes
an order status monitoring unit configured to query the server about current status of the orders based on the order identifiers in the order management information,
wherein the order management information updating unit is configured to identify the order identifiers corresponding to errors that have been recovered based on results of the query sent from the server and remove order records corresponding to the identified order identifiers from the order management information.

9. The ordering system as claimed in claim 8, wherein
the message generating unit is configured to generate messages indicating the updated order status based on the order management information after the order records are removed; and
the message transmission unit is configured to send the generated messages to the corresponding electronic apparatuses and request the electronic apparatuses to display the messages.

10. The ordering system as claimed in claim 7, wherein the information processing apparatus further includes
a detailed order status request receiving unit configured to receive the apparatus identifier and a detailed order status request from the electronic apparatus;
a detailed order status obtaining unit configured to identify the order identifiers in the order management information corresponding to the received apparatus identifier and obtain detailed order status information corresponding to the identified order identifiers from the server; and
a detailed order status information transmitting unit configured to send the obtained detailed order status information to the electronic apparatus.

11. A method performed by an information processing apparatus connected via a data communication channel to at least one electronic apparatus and a server, the method comprising:
receiving, from the electronic apparatus, apparatus status information including an apparatus status detected at the electronic apparatus and an apparatus identifier for identifying the electronic apparatus;
storing, in the information processing apparatus, order management information where order identifiers for identifying orders, error identifiers for identifying errors, and apparatus identifiers for identifying electronic apparatuses are associated with each other;
when the received apparatus status information includes error information indicating an error detected at the electronic apparatus and an order request, determining an order item to be ordered;
generating order information including the apparatus identifier and the error information in the received apparatus status information based on the determined order item and sending the order information to the server;
receiving an order identifier from the server in response to the order information;
adding an order record to the order management information, the order record including the order identifier received from the server, an error identifier corresponding to the error information, and the apparatus identifier that are associated with each other;
obtaining message content information corresponding to an error type of the error information from message management information that is stored in the information processing apparatus and includes multiple sets of the message content information associated with error types;
generating a message including the obtained message content information and the order identifier; and
sending the message to the electronic apparatus sending the apparatus status information and requesting the electronic apparatus to display the message.

12. The method as claimed in claim 11, further comprising:
storing, in the information processing apparatus, transmission management information where the apparatus identifiers and the error identifiers are associated with each other;
adding a transmission record including the apparatus identifier of the electronic apparatus to which the message is sent and the error identifier corresponding to the message content information included in the message;
when the received apparatus status information includes recovery information indicating recovery from the error detected at the electronic apparatus and an order status update request, removing the order record corresponding to the apparatus identifier in the apparatus status information and the error identifier of the error indicated by the recovery information from the order management information;
removing the transmission record corresponding to the apparatus identifier in the apparatus status information and the error identifier of the error indicated by the recovery information from the transmission management information;
identifying, from the transmission management information, the error identifier corresponding to the apparatus identifier of the electronic apparatus sending the apparatus status information including the recovery information and generating a message indicating an updated order status based on the identified error identifier; and
sending the message indicating the updated order status to the electronic apparatus sending the apparatus status information including the order status update request and requesting the electronic apparatus to display the message indicating the updated order status.

13. The method as claimed in claim 12, further comprising:
querying the server about current status of the orders based on the order identifiers in the order management information; and
identifying the order identifiers corresponding to errors that have been recovered based on results of the query sent from the server and removing order records corresponding to the identified order identifiers from the order management information.

14. The method as claimed in claim 13, further comprising:

generating messages indicating the updated order status based on the order management information after the order records are removed; and sending the generated messages to the corresponding electronic apparatuses and requesting the electronic apparatuses to display the messages.

15. The method as claimed in claim 12, further comprising:

receiving the apparatus identifier and a detailed order status request from the electronic apparatus;

identifying the order identifiers in the order management information corresponding to the received apparatus identifier and obtaining detailed order status information corresponding to the identified order identifiers from the server; and sending the obtained detailed order status information to the electronic apparatus.

* * * * *